(12) United States Patent
Eitelhuber

(10) Patent No.: US 10,576,508 B2
(45) Date of Patent: Mar. 3, 2020

(54) SYSTEM AND METHOD FOR CONVEYING AN ASSEMBLY

(71) Applicant: KING ABDULLAH UNIVERSITY OF SCIENCE AND TECHNOLOGY, Thuwal (SA)

(72) Inventor: Georg Eitelhuber, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 365 days.

(21) Appl. No.: 15/547,765

(22) PCT Filed: Feb. 16, 2016

(86) PCT No.: PCT/IB2016/000210
§ 371 (c)(1),
(2) Date: Jul. 31, 2017

(87) PCT Pub. No.: WO2016/132214
PCT Pub. Date: Aug. 25, 2016

(65) Prior Publication Data
US 2018/0009006 A1      Jan. 11, 2018

Related U.S. Application Data

(60) Provisional application No. PCT/IB2016/000210, filed on Feb. 16, 2016, provisional application No. 62/117,434, filed on Feb. 17, 2015.

(51) Int. Cl.
*B08B 1/00* (2006.01)
*B08B 1/04* (2006.01)
(Continued)

(52) U.S. Cl.
CPC ............ *B08B 1/008* (2013.01); *A46B 13/001* (2013.01); *A46B 13/02* (2013.01);
(Continued)

(58) Field of Classification Search
CPC ........... F24J 2/461; H02S 40/10; H02S 40/12; A47L 1/02; B08B 1/008; B08B 1/04; F24S 40/24
See application file for complete search history.

(56) References Cited

U.S. PATENT DOCUMENTS

2013/0097790 A1      4/2013   Liao

FOREIGN PATENT DOCUMENTS

CA        2844535 A1      2/2013
CN        2658648          11/2004
(Continued)

OTHER PUBLICATIONS

International Search Report in related International Application No. PCT/IB2016/000210, dated Jun. 20, 2016.
(Continued)

*Primary Examiner* — Shay Karls
(74) *Attorney, Agent, or Firm* — Patent Portfolio Builders PLLC

(57) ABSTRACT

A cleaning system and method can include a leading carriage assembly attached to a brush assembly and can be configured to drive the brush assembly. A trailing carriage assembly can be configured to move along a track. The trailing carriage assembly can be attached to an arm. A vertical support rod can be partially disposed within the arm and can be attached to the brush assembly. A height of the vertical support rod can be positioned by one or more clamps located around the vertical support rod.

20 Claims, 27 Drawing Sheets

(51) Int. Cl.
    *H02S 40/10*     (2014.01)
    *B08B 1/02*     (2006.01)
    *F24S 40/20*     (2018.01)
    *A46B 13/00*     (2006.01)
    *A46B 13/02*     (2006.01)
    *A46B 15/00*     (2006.01)
    *F24S 25/00*     (2018.01)
    *F24S 25/30*     (2018.01)

(52) U.S. Cl.
    CPC .......... *A46B 15/0004* (2013.01); *B08B 1/002* (2013.01); *B08B 1/02* (2013.01); *B08B 1/04* (2013.01); *F24S 40/20* (2018.05); *H02S 40/10* (2014.12); *A46B 2200/3073* (2013.01); *F24S 25/30* (2018.05); *F24S 2025/801* (2018.05); *Y02E 10/40* (2013.01)

(56) References Cited

FOREIGN PATENT DOCUMENTS

| | | |
|---|---|---|
| EP | 2437001 B1 | 8/2013 |
| GB | 2243070 B | 3/1994 |
| WO | 2013017960 A3 | 6/2013 |
| WO | 2015004535 A3 | 8/2015 |

OTHER PUBLICATIONS

Written Opinion of the International Searching Authority in related International Application No. PCT/IB2016/000210, dated Jun. 20, 2016.
Chinese First Office Action in related Chinese Application No. 201680021309.6, dated Oct. 29, 2018 (Documents 1-3, (EP, GB and WO) were cited in the IDS filed Jul. 31, 2017).

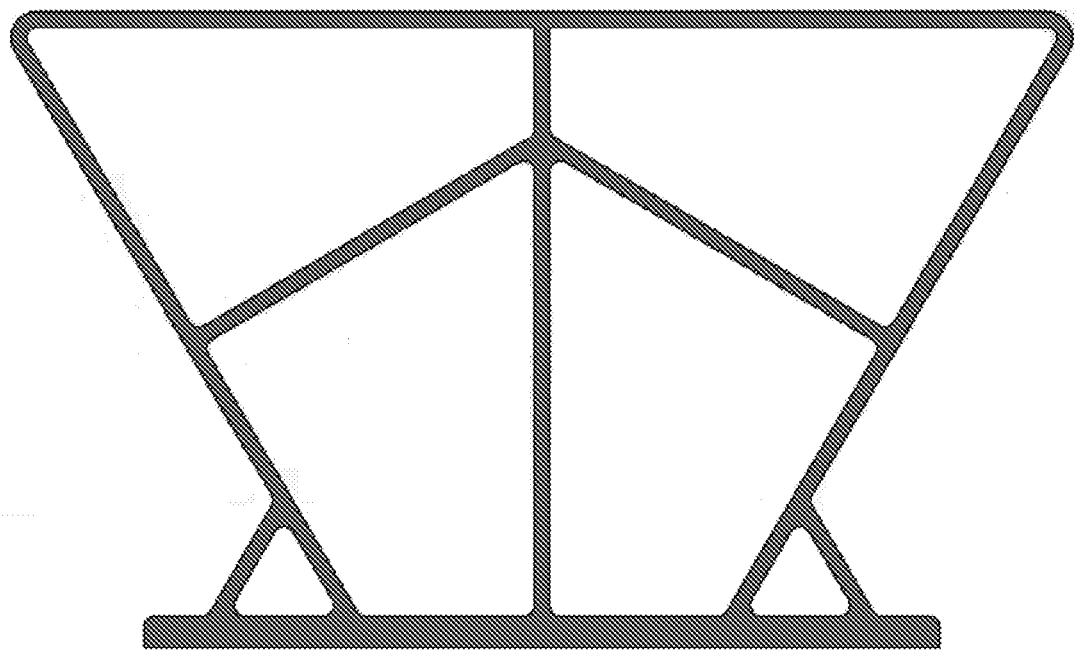
Figure 5
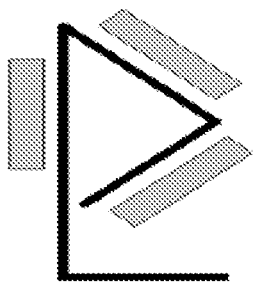 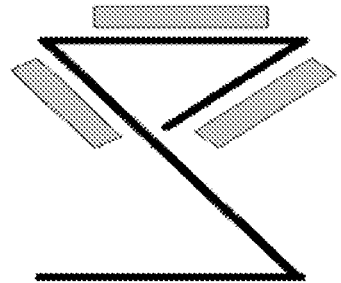 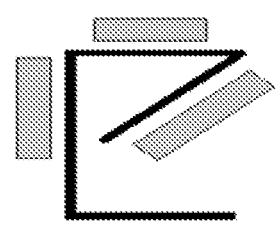
Figure 6A          Figure 6B          Figure 6C

SYSTEM AND METHOD FOR CONVEYING AN ASSEMBLY

CLAIM OF PRIORITY

This application claims priority to U.S. Provisional Patent Application No. 62/117,434, filed Feb. 17, 2015, which is incorporated by reference in its entirety.

TECHNICAL FIELD

The present invention is directed to a system and method for translating an assembly along a track, such as a duster for dusting a photovoltaic array.

BACKGROUND

The efficiency of a solar panel is measured by the ratio of the amount of sunlight it receives to the amount of electricity it generates. After a solar panel is installed, dust and other debris typically begin to accumulate on the solar panel surfaces. Dust accumulated on a solar panel reduces the number of photons reaching the photovoltaic elements and thereby reduces the power the solar panel can generate during a unit of time. In other words, dust can significantly reduce the efficiency of the solar panel. Therefore, many systems include a solar panel cleaning system to improve the efficiency of solar panels.

Solar panel cleaners in the prior art can be categorized as manual and automated types. Manual cleaners generally include manually operated sweeping brushes, power washers, and powered brushes. Automated cleaners generally include buffer-style and rotating bristle-style devices. Prior rotating bristle-style cleaners generally use a system for translating the brush while the rotational axis of the brush is maintained in an orientation that is perpendicular to the direction of travel. In other words, the top and bottom of the brush sweep across the panel at an even rate without one moving out ahead of the other. Complicated and mechanically inefficient systems are typically required to maintain the rotating brush in a perpendicular orientation as it traverses the solar panels. Changes in temperature and other variables can affect the functioning of such dusters.

Typically, most solar panel cleaning systems also use liquid cleaning solutions or water for cleaning the solar panels. The moistened dust and debris may become sticky and adhere to the surfaces of the solar panel, which can complicate the cleaning process. This is especially true in hot arid regions where solar panels are often found. A further problem with using water in arid regions is in maintaining or supplying water at the site of the solar array.

SUMMARY

In an aspect, a track system can include a rail and a carriage assembly. The rail can include a first planar side, a second planar side, and a third planar side. The first, second, and third planar sides can be arranged to form at least two acute angles. The carriage assembly can include a drive wheel and at least two roller sets. The drive wheel can be configured to contact the first planar side and can be configured to translate the carriage assembly along the rail. A first roller set of the at least two roller sets can be configured to contact the second planar side, and a second roller set of the at least two roller sets can be configured to contact the third planar side.

In some embodiments, the track system can include a motor. The motor can be configured to actuate the drive wheel and translate the carriage assembly. The drive wheel can be a load bearing roller. The carriage assembly can further include a pivot. The pivot can be configured to pivot an attached component. In other embodiments, the drive wheel and the at least two rollers can be configured to maintain the carriage assembly in contact with the rail.

In some embodiments, the rail can be formed of a cold rolled metal, for example cold rolled steel, and/or the rail can be formed of an extruded metal, such extruded aluminum. The at least two rollers can comprise a silicon material, a metal material and/or a polymer material. The rail can be solid or hollow. The rail can include internal support structures and hollow areas.

In another aspect, a conveying method can include the steps of providing a rail, providing a carriage assembly, and translating the carriage assembly along the rail. The rail can include a first planar side, a second planar side, and a third planar side. The first, second, and third planar sides can be arranged to form at least two acute angles. The carriage assembly can include a drive wheel and at least two roller sets. The drive wheel can be configured to contact the first planar side. A first roller set of the at least two roller sets can be configured to contact the second planar side. A second roller set of the at least two roller sets can be configured to contact the third planar side.

In some embodiments, the method can include actuating a motor, causing the drive wheel to translate the carriage assembly. The drive wheel can be a load bearing roller. The drive wheel and the at least two rollers maintain the carriage assembly in contact with the rail.

In embodiments, the method can include pivoting an attached component, such as an assembly. The rail can be formed of a cold rolled metal and/or an extruded metal. The drive wheel and the at least two rollers comprise a silicon material, a metal material, and/or a polymer material.

In an aspect, a cleaning apparatus can include a brush assembly, a drive, and a pivot. The brush assembly can include at least one rotatable brush having a rotational axis. The drive can be configured to translate the brush assembly parallel to a track. The pivot can be configured to pivot the rotational axis in a plane parallel to the track and the rotational axis.

In embodiments, the cleaning apparatus can include a trailing assembly slidably attached to the brush assembly. The trailing assembly can be configured to translate along a second track. The pivot can be configured to allow the brush assembly to pivot in the plane to an angle that is not perpendicular to the track. The angle can be between 30 deg. and 80 deg., between 40 deg. and 75 deg., between 50 deg. and 70 deg., and/or between 55 deg. and 65 deg. The angle can be less than 60 deg.

In some embodiments, the drive wheel can include a drive motor. The brush assembly can include a brush motor configured to rotate the at least one rotatable brush about the rotational axis. The at least one rotatable brush can include a sweeping member. In some embodiments, the sweeping member can have a bristle pattern parallel to the rotational axis. The sweeping member can comprise a polymer, a natural fiber, and/or metal bristles. The sweeping member can comprise a foam or spongy material.

In embodiments, the at least one rotatable brush can include a shaft extending along the rotational axis and a sweeping member coupled to the shaft and configured to be rotatable about the rotational axis. The pivot can be configured to rotate the shaft clockwise and/or counter-clockwise, as well as in a plane parallel to a solar panel or other element such as a window or mirror. The rotational axis is not perpendicular to the direction of the track while the cleaning apparatus is in an operational configuration.

In another aspect, a method of cleaning can include the steps of providing a brush assembly, pivoting the rotational axis of a rotatable brush, and translating the brush assembly parallel to a track. The brush assembly can include at least one rotatable brush having a rotational axis. The plane defined by pivoting the rotational axis can be in a plane parallel to the track.

In some embodiments, the method can include providing a trailing assembly slidably attached to the brush assembly and translating the trailing assembly along a second track. In other embodiments, the method can include pivoting the brush assembly in the plane to an angle that is nonperpendicular to the track. The angle can be between 30 deg. and 80 deg., between 40 deg. and 75 deg., between 50 deg. and 70 deg., and/or between 55 deg. and 65 deg. The angle can be less than 60 deg.

In other embodiments, the method can include operating a brush motor to rotate the at least one rotatable brush about the rotational axis. The at least one rotatable brush can include a sweeping member having a bristle pattern parallel to the rotational axis.

In an aspect, a photovoltaic array can include a rail and a solar panel mounted to the rail. The rail can include a first planar side, a second planar side, and a third planar side. The first, second, and third planar sides can be arranged to form at least a first acute angle and a second acute angle.

In some embodiments, the rail can be formed of a cold rolled metal and/or an extruded metal.

In some embodiments, the array can further include a carriage assembly and a brush assembly. The carriage assembly can include a pivot, a drive wheel, and at least two roller sets. The brush assembly can include at least one rotatable brush having a rotational axis. The brush assembly can be pivotally attached to the carriage assembly.

In other embodiments, the drive wheel can be configured to contact the first planar side and can be configured to translate the carriage assembly along the rail. A first roller set of the at least two roller sets can be configured to contact the second planar side. A second roller set of the at least two roller sets can be configured to contact the third planar side.

In yet other embodiments, the solar panel can be further mounted to a second rail. The rail and the second rail can be in a plane substantially parallel to a solar panel. The second rail can include three planar sides arranged to form at least a third acute angle and a fourth acute angle.

In some embodiments, the array can include a trailing carriage assembly slidably attached to the brush assembly. The trailing carriage can include at least three roller sets. The at least three roller sets include at least one drive wheel.

In other embodiments, the rotational axis can be nonperpendicular to the rail when the photovoltaic array is in an operational configuration.

In yet other embodiments, the array can include a housing for containing a brush assembly. The brush assembly can include at least one rotatable brush having a rotational axis. The brush assembly can be pivotally attached to a carriage assembly.

In some embodiments, the array can include a mounting frame configured to maintain the solar panel in relation to the rail. The mounting frame can include a c-shape cross section and a material for securing the solar panel. The material can be a polymer, an elastomer, an adhesive, and/or a resin.

In an aspect, a track system can include a channel and a carriage. The channel can include a first planar side and a second planar side. The first and second planar sides can be arranged at an acute angle. The carriage assembly can include a drive wheel and at least two rollers. The drive wheel can be in contact with the first planar side and can be configured to translate the carriage assembly along the channel. At least one of the at least two rollers can be in contact with the second planar side.

In some embodiments, the carriage assembly can further include a pivot. In other embodiments, the track system can include a means for dust abatement. The means for dust abatement can include a flexible hood and/or bristles, for instance, along the top of the channel. The means can include egress apertures along the bottom and/or sides of the channel. Additionally, a skirt around the pivot and sliding members can be utilized to prevent dust and debris from falling into the channel. Further, the assembly components can be disposed in a housing to seal them from dust and dirt.

In other embodiments, the system can include a brush assembly. The brush assembly can include one or more rotatable brushes, each having a rotational axis. The pivot can be configured to pivot the brush assembly.

In yet other embodiments, the system can include a panel. The panel can be a photovoltaic solar panel, a window, and/or a mirror. The panel can be mounted to the channel. The top of the channel can be substantially flush with the panel. The pivot can be configured to allow pivoting the rotational axis in a plane parallel to the panel. The carriage assembly can be configured to translate the brush assembly in a direction that is nonperpendicular to the rotational axis.

In another aspect, a method of conveying can include the steps of providing a channel, providing a carriage assembly, and translating the carriage assembly along the channel. The channel can include a first planar side, a second planar side, and an open face. The first and second planar sides can be arranged at an acute angle. The carriage assembly can include a drive wheel and at least two rollers. The drive wheel can be in contact with the first planar side. At least one of the at least two rollers can be in contact with the second planar side.

In some embodiments, the carriage assembly can further include a pivot. The method can further include abating dust ingress into the channel.

In yet other embodiments, the open face of the channel can be substantially flush with a panel. The method can further include pivoting the rotational axis in a plane parallel to the panel, and translating the brush assembly in a direction that is nonperpendicular to the rotational axis.

In other embodiments, the method can include providing a brush assembly and pivoting the brush assembly. The brush assembly can include one or more rotatable brushes each having a rotational axis.

In other embodiments, the cleaning system can include a brush assembly for cleaning the solar panels. The brush assembly can include a brush having one or more bristles extending outwardly from a core. A shaft can extend through the core of the brush. The shaft can be a telescoping shaft, which is configured to retract and expand to create an elongated brush assembly

BRIEF DESCRIPTION OF THE DRAWINGS

Embodiments are further described in the detailed description which follows, in reference to the noted plurality of drawings by way of non-limiting examples of certain embodiments of the present invention, in which like numerals represent like elements throughout the several views of the drawings, and wherein:

FIG. 5 depicts an exemplary cross section of a rail.

FIGS. 6A-6C depict exemplary configurations of rail cross sections.

FIGS. 20A-20E depict an exemplary embodiment of a brush assembly.

DETAILED DESCRIPTION

Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention. As an example, the description below discusses panels primarily with respect to photovoltaic solar panels. Nonetheless, the term panel can mean a window, such as a skylight, a mirror, or any plane for which the cleaning system can be utilized.

Applicant hereby incorporates by reference in its entirety U.S. application Ser. No. 13/567,205, filed by Inventor Georg Eitelhuber on Aug. 6, 2012. The application was published as US 2013/0037051 A1 on Feb. 14, 2013. The language and embodiments of the application will not be repeated herein for the purpose of brevity.

Figure 1:
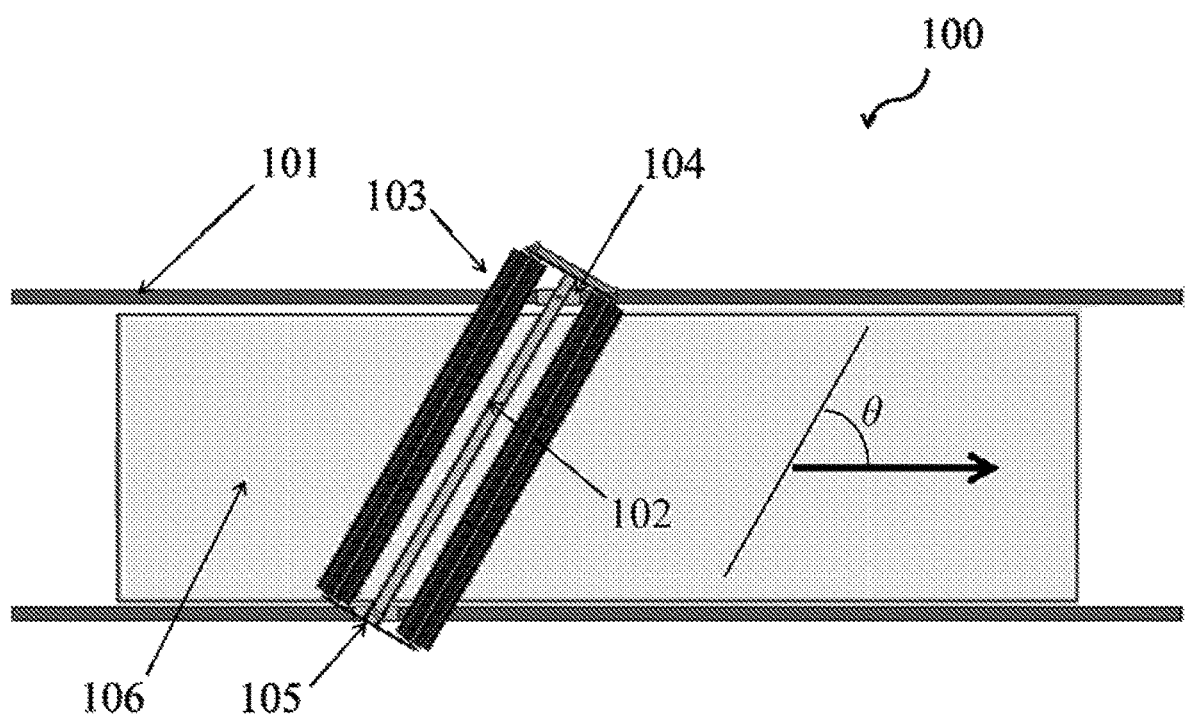
FIG. 1 depicts an exemplary system in an operational position.

An exemplary embodiment is shown schematically in FIG. 1. The track and cleaning system (100) can have a brush assembly (102) with at least one rotatable brush (103) having a rotational axis. A drive can be configured to translate the brush assembly parallel to the rail (101). A carriage assembly (104) for translating the brush assembly can have a pivot, which can be configured to allow pivoting of the rotational axis in a plane parallel to the rails and the rotational axis, which is also parallel to panel (106). The pivoting action can further be aided by a trailing assembly (105), which can have another pivot that is slidably attached to the brush assembly. Directional arrow shows the direction of travel of the brush and carriage assemblies. The angle, θ, between the direction of travel and the rotational axis of the brushes can be less than ninety degrees when the duster is operating.

Figure 2A:
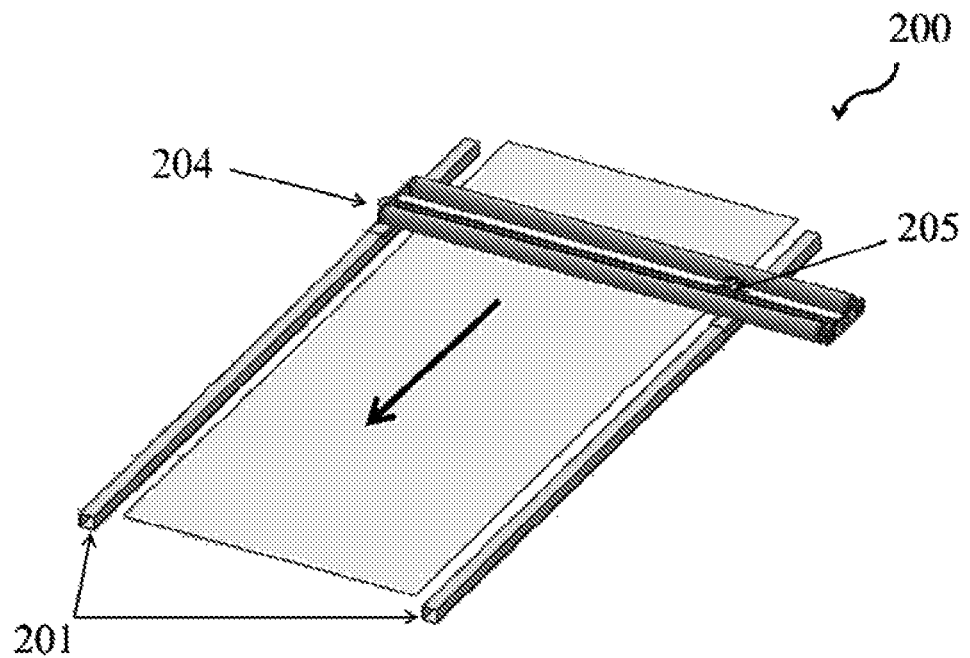
FIGS. 2A-2C depict an exemplary system in initial, intermediate, and operational configurations.
Figure 2B:
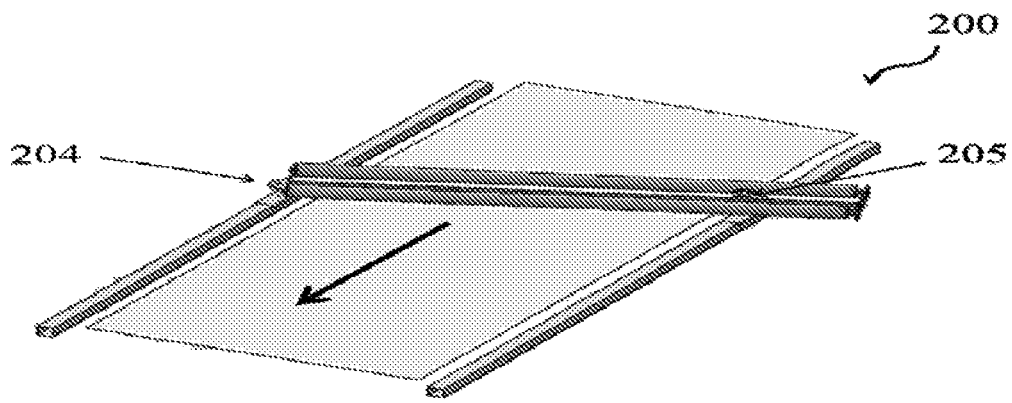
Figure 2C:
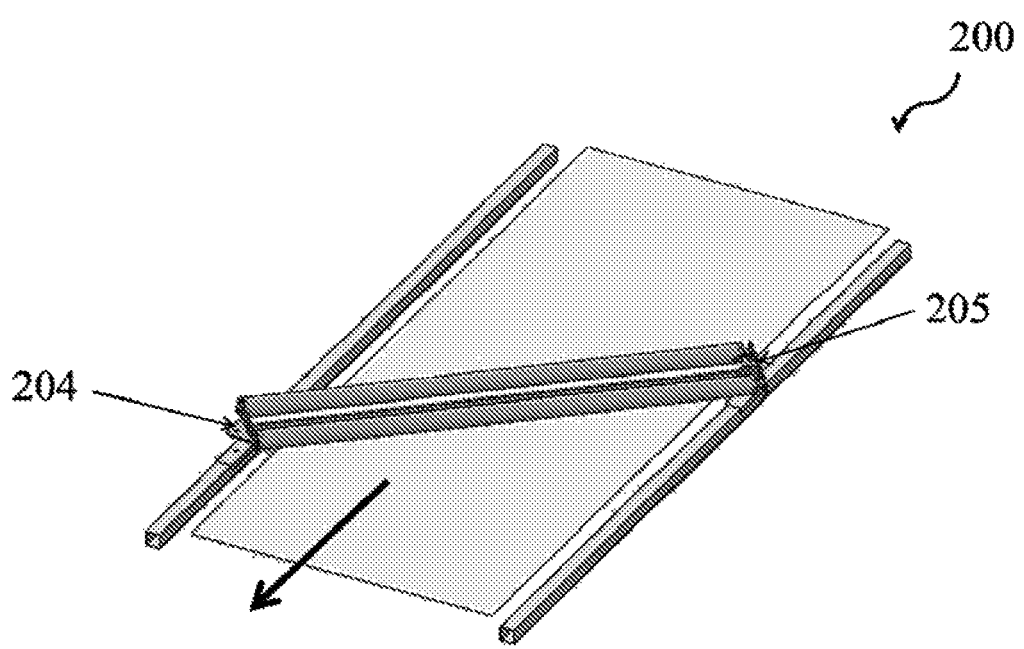

FIGS. 2A-2C show a cleaning system in an initial configuration, as well as two operational configurations. As the carriage assembly (204) is driven across the panel, the pivots in the carriage (204) and trailing (205) assemblies can allow the longitudinal axis of the brushes to rotate parallel to the panel. Initially, the brushes can overhang the trailing assembly. This distance of overhang can decrease as the brushes rotate into an operating position, as shown in FIGS. 2B and 2C.

An advantageous aspect of the system is the way the device can slide up into an angled position that can allow the top end to lead. This can allow dust and debris to fall forward and away from the brush-panel interface. The unique roller support on the bottom of the brush assembly can allow the system to be supported by a cart, always directly over the rail.

Leading the top edge of the brush assembly can dramatically increase effectiveness of the cleaning in several ways. The dust at the top need not be re-brushed many times on the way down after being dislodged, as can happen if the brush is constrained vertically.

Further, the bristle pattern on the brushes can be straight instead of spiral. This can facilitate flicking the dust and debris from the surface, rather than grinding them across the panel surface by lateral relative velocity of a bristle spiral. Yet because of the nonperpendicular angle, with respect to the direction of travel, dust and debris can still be directed towards the bottom edge more rapidly.

In an embodiment, the solar panel cleaning system can incorporate one or more support assemblies to support the brushes. The system can also have one or more motors to operate the rotatable brushes and/or a drive wheel. The rotatable brushes can move across a panel in a direction, for example as shown by the directional arrows in FIGS. 1-4, and/or in the opposite direction. Additionally, the rotatable brushes can pivot to a certain degree across the surface.

When in a run position, i.e. an operational position, the angle θ between the direction of travel, defined by the direction of the track, and the rotational axis, defined by the longitudinal axis of one or more of the brushes, can be between zero and 180 degrees. When the brushes are in rest position, the rotational axis can be perpendicular to the rails. Further, the rotatable brushes can be rotated counter-clockwise and/or clockwise from a rest position to reach an operating position.

The embodiment of FIG. 2C shows an operating configuration where the angle has been defined by the length of the brush assembly. Once the sliding member reaches the end of the brush assembly, the trailing assembly can be pulled by the driven carriage assembly at a defined angle. The embodiment of FIG. 2B shows an operating configuration in which the brush assembly is allowed to pivot until an equilibrium angle is achieved. The mechanical advantages in the embodiments are manifold. For example, the tracks can have very large tolerances for lateral distance apart, and the brush can simply find its own angle comfortably. For straight brushes, conversely, such changes in the lateral angle would result in the system pulling itself apart. Exemplary operating angles can include 30 to 80 degrees, 40 to 75 degrees, 50 to 70 degrees, 55 to 65 degrees, and/or less than 60 degrees.

Figure 3A:
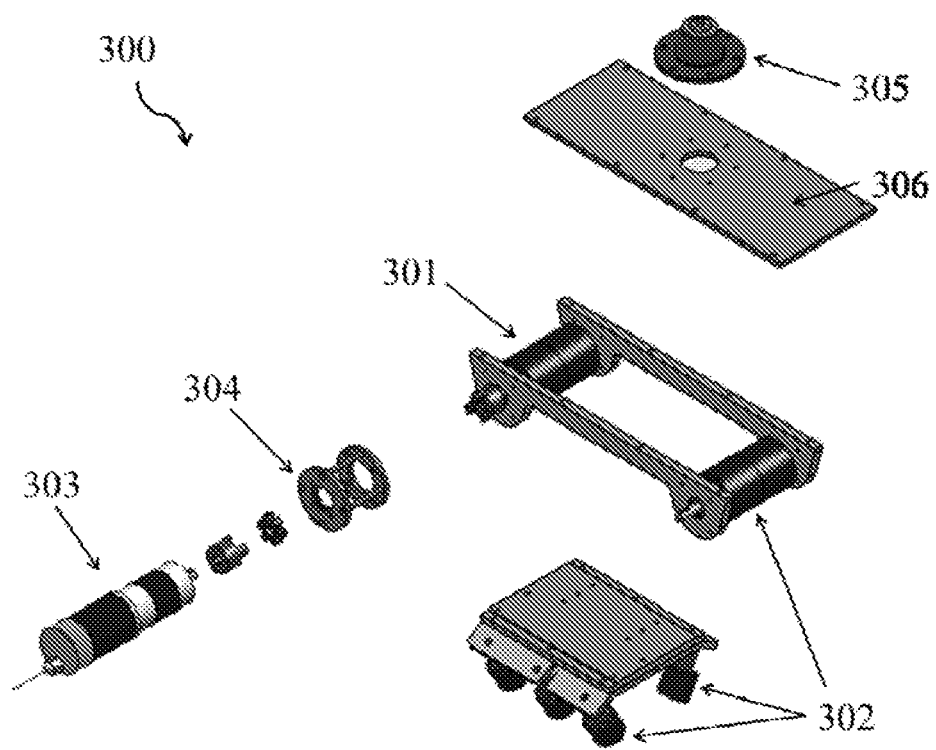
FIGS. 3A and 3B depict an exemplary carriage assembly.
Figure 3B:
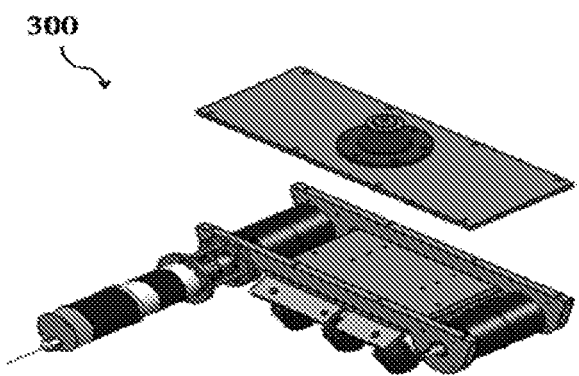

FIGS. 3A and 3B are an exploded view and a substantially assembled depiction of the carriage assembly (300). The carriage can have one or more drive wheels. In the exemplary embodiment of FIG. 3, drive wheel (301) can be attached to motor (303) by means of a coupling (304). Rollers (302) can form a triangular shape when assembled so as to hold tight to a rail with a triangular cross section. The term roller herein can mean wheel, caster, bearing, roller bearing, and/or other elements. The carriage can further have a pivot (305) mounted to a pivot plate (306) or be otherwise mounted.

Figure 4:
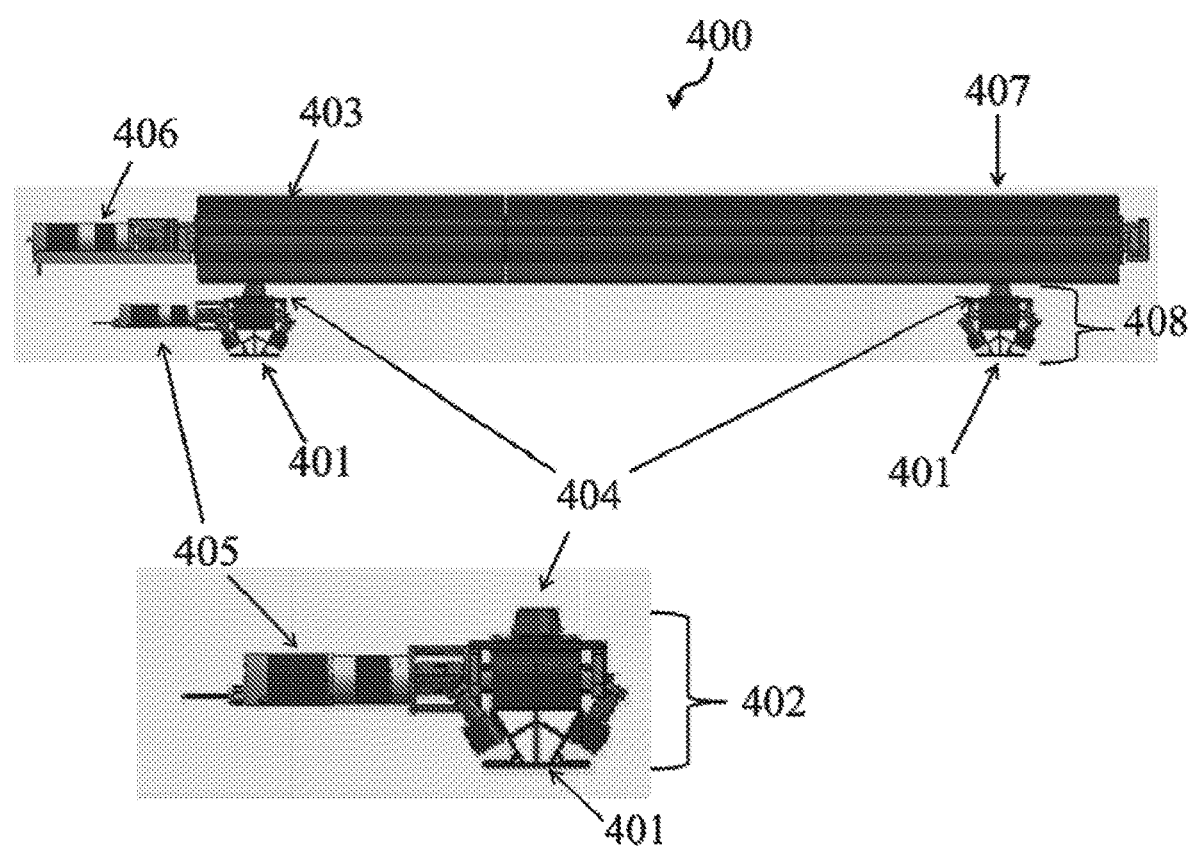
FIG. 4 depicts an exemplary track and cleaning system.

The triangular shape of the rollers is shown in the exemplary cleaning system (400) of FIG. 4. As can be seen, carriage assembly (402) can be configured to hold tight onto rails (401), which have a triangular cross section. A closer view of the cross section of the rail, including hollow areas and exemplary internal support structures, can be seen in FIG. 5.

Referring again to FIG. 4, a brush assembly can frame rotatable brushes (403) and be attached to pivots (404). The brush assembly can thereby be attached to the drive wheel, via the carriage assembly, and to the trailing assembly (408), via a slidable pivot (407). The rotatable brushes can include a shaft and a sweeping member. The sweeping member can be made of bristles comprising bristles, such as hair, plastic, and/or metal bristles. Alternatively, the sweeping member can be made of foam and/or sponge.

A brush assembly motor (406) can be used to actuate and/or rotate the rotatable brushes about their longitudinal axes. The shaft can be coupled to a drive transmission. The brushes can rotate about their axes such that the part of the brush in contact with the surface moves in the same direction as the direction of travel of the brush assembly and/or in the opposite direction. The carriage assembly can be coupled to a drive motor (405). Although not shown in FIG. 4, the trailing assembly can also be coupled to a drive motor, for example to facilitate returning the brushes to a perpendicular orientation for storing and/or to facilitate reversing the direction of travel. Alternatively, the brushes can be configured to return to a perpendicular orientation, with respect to the track, simply by continuing to rotate the brushes as the drive motor translates the brush assembly to its starting position opposite the directional arrow.

In an embodiment, there can be one motor to operate the rotatable brushes. The brushes can be configured to rotate in the same direction synchronously or in two different directions through the use of gears. Gearing can be utilized to rotate different brushes of a multi-brush assembly at different speeds. In an embodiment there can be two or more motors. In such an embodiment, several brushes can be individually operated by different motors.

FIG. 5 shows a rail having a triangular cross section. The shape and internal support features can be achieved an extrusion process. The rail can be, for example, extruded aluminum. Such is advantageous as the rail can be very stiff and rigid. Moreover, such a rail can have a closed configuration and can have good bending moment characteristics.

FIGS. 6A-6C show alternative rail configurations that can be advantageously fabricated from cold rolling processes. Such materials as cold rolled steel provide many benefits. The rails can be long, without seams, and very strong. Cold rolled rails can be very stiff, and ordinary cold rolled steel can be utilized inexpensively. Moreover, cold rolled metal can further act as a load bearing member to provide structural support, for example, to an entire photovoltaic array. The grey rectangles in FIGS. 6A-6C represent roller positions around the rail. An advantage to the triangular cross sections in FIGS. 5 and 6 is that the number of rollers for maintaining the carriage and/or trailing assemblies on the rails is minimized.

Figure 7:
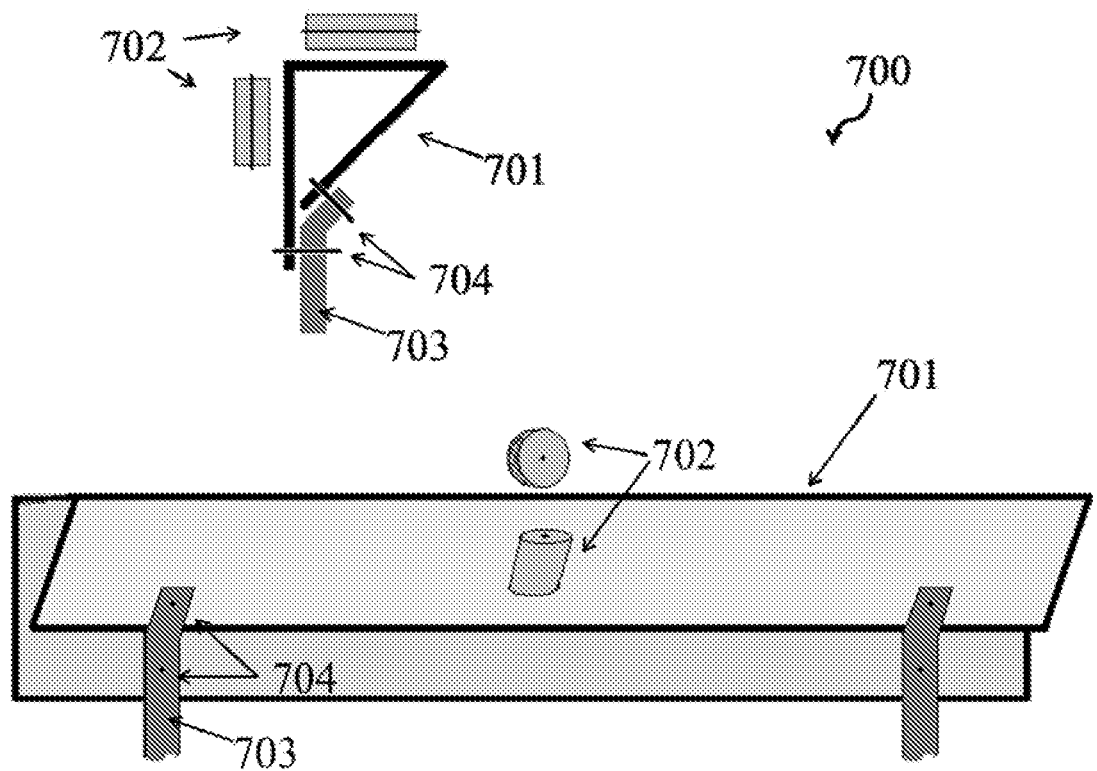
FIG. 7 depicts two views of an exemplary track.

FIG. 7 shows a track system (700) that can include a rail (701). Rollers (702) can be utilized on all three of the planar faces of the rail. The rail can include intermittent supports (703) and fasteners (704), such as bolts and/or rivets. The intermittent supports can be, though need not be, attached to a solar panel support or to a solar panel directly. If made for the track alone, and not a load bearing member, intermittent supports can be used to attach the track to the main support. The supports can provide additional stiffness to the cross section of the rail by joining the two parts of the rail intermittently.

Figure 8A:
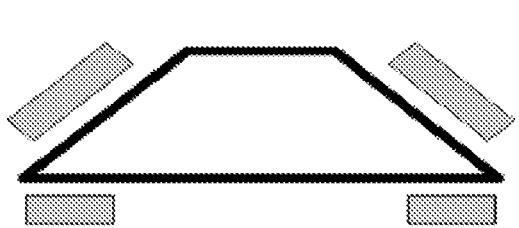
FIGS. 8A and 8B depict cross sections of exemplary rails.
Figure 8B:
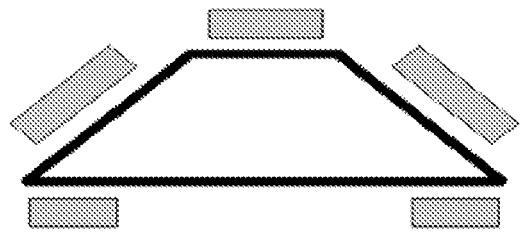

Although an advantage of the present system is in the minimization of the number of rollers and/or roller assemblies required, it can be advantageous and/or convenient to use rollers on four or five faces of a track. FIGS. 8A and 8B shows contemplated rail configurations, as well as various roller positions.

Figure 9:
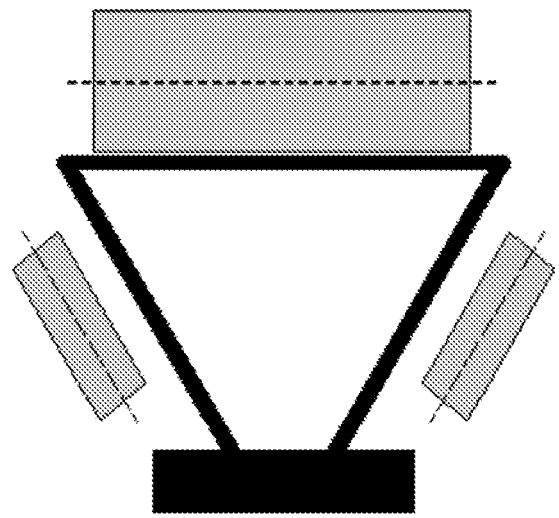
FIG. 9 depicts an exemplary cross section of an external rail track.
Figure 10:
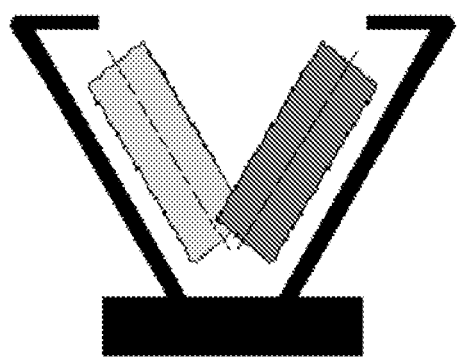
FIG. 10 depicts an exemplary cross section of an internal rail track.

Two alternative embodiments are shown in FIGS. 9 and 10. FIG. 9 shows an external rail configuration with a triangular cross section. A drive wheel is represented by the large rectangle on top and two sets of complimentary rollers are represented by the rectangles on either side of the rail. In FIG. 10, the rollers are internal to the rail. An internal rail can be beneficial is it can be more compact than an external rail. Moreover, as will be shown, an internal rail can allow a brush system to be disposed close to the plane of a surface by mounting the rail such that the top of the channel is flush with the surface to be swept.

Figure 11:
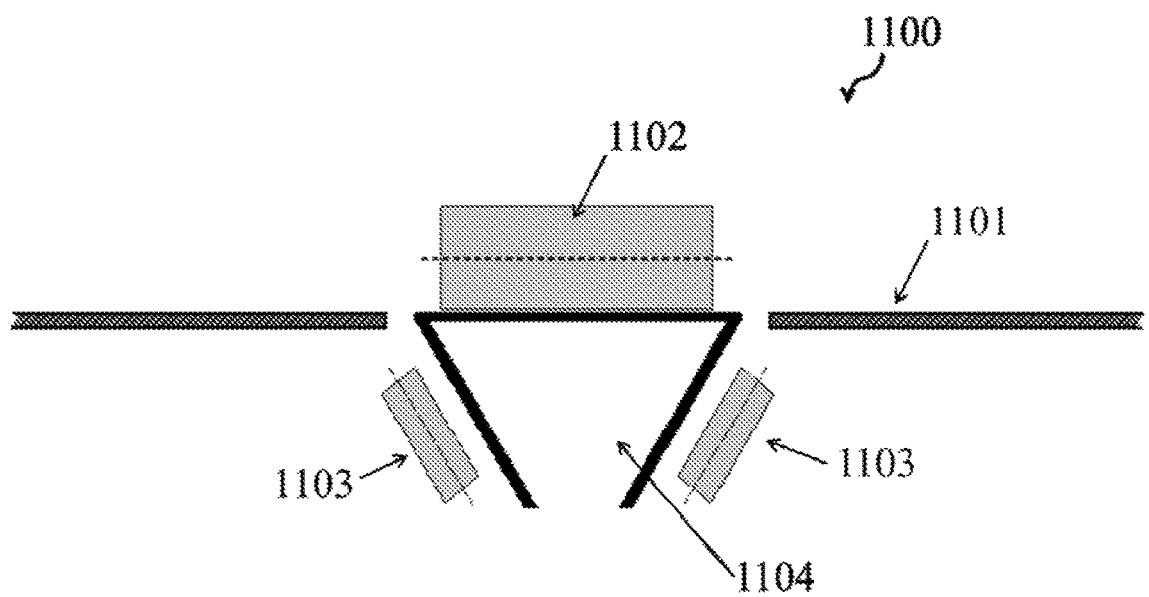
FIG. 11 depicts an exemplary embodiment of a photovoltaic array system.
Figure 12:
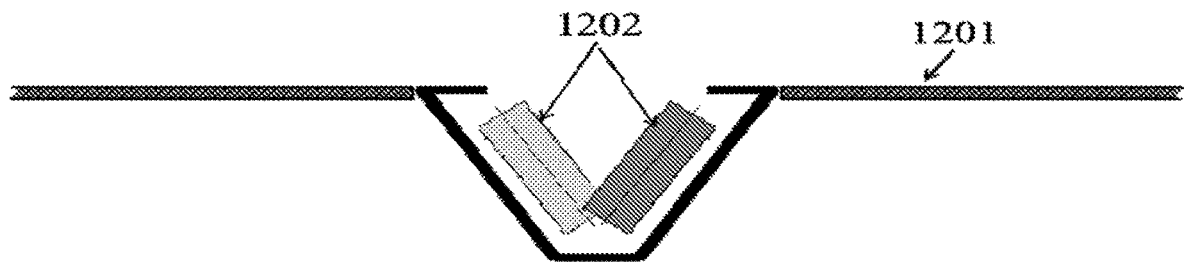
FIG. 12 depicts an exemplary embodiment of a photovoltaic array system.

FIGS. 11 and 12 show two configurations for positioning a solar panel cleaning system (1100) close to the surface to be cleaned, for example a solar panel surface (1101). A primary roller (1102), i.e. a load-bearing drive wheel, is positioned on top of a triangular rail (1104). The top surface of the rail has been disposed in the plane of the solar panel surface. Complementary rollers (1103) are shown on either side of the triangular rail. In FIG. 12, the rollers can be more compactly configured within the channel of the rail, dramatically reducing the profile of the cleaning system. Further, the configuration can allow the rail and cleaning system to be disposed very close the surface to be cleaned. It can be advantageous to include means for dust abatement, such as a flexible hood or bristles along the top of the channel and/or egress apertures along the bottom of the channel. Additionally, a skirt around the pivot and sliding members can be utilized to prevent dust and debris from falling into the channel. Further, the assembly components can be disposed in a housing to seal them from dust and dirt.

The system can further include a self-cleaning system configured to automatically clean the one or more rotatable brushes. The system can be integrated with a housing for the brushes or merely attached to an edge of a panel array. A self-cleaning member can include a stiff brush, a row of rake-like tines, a bar, or other effective elements against which the rotating brushes can pass while rotating and thereby eliminate excess dust and debris buildup.

Figure 13:
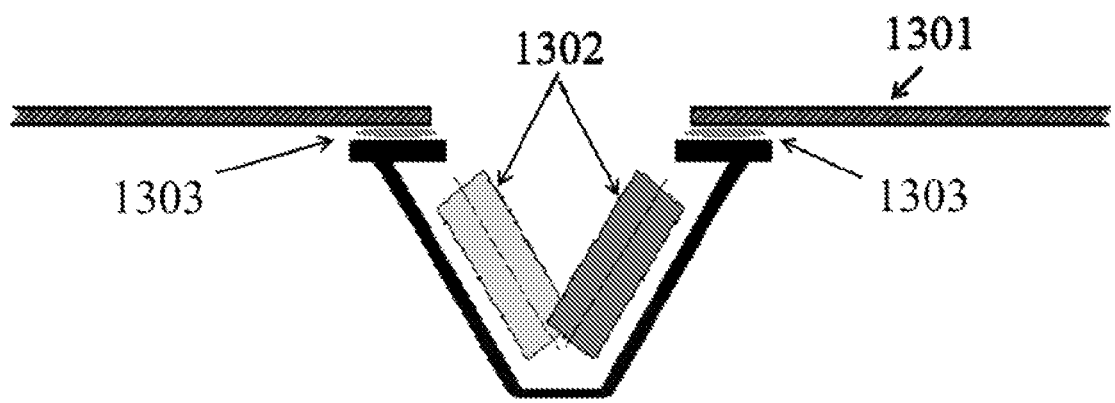
FIG. 13 depicts an exemplary embodiment of a photovoltaic array system.
Figure 14:
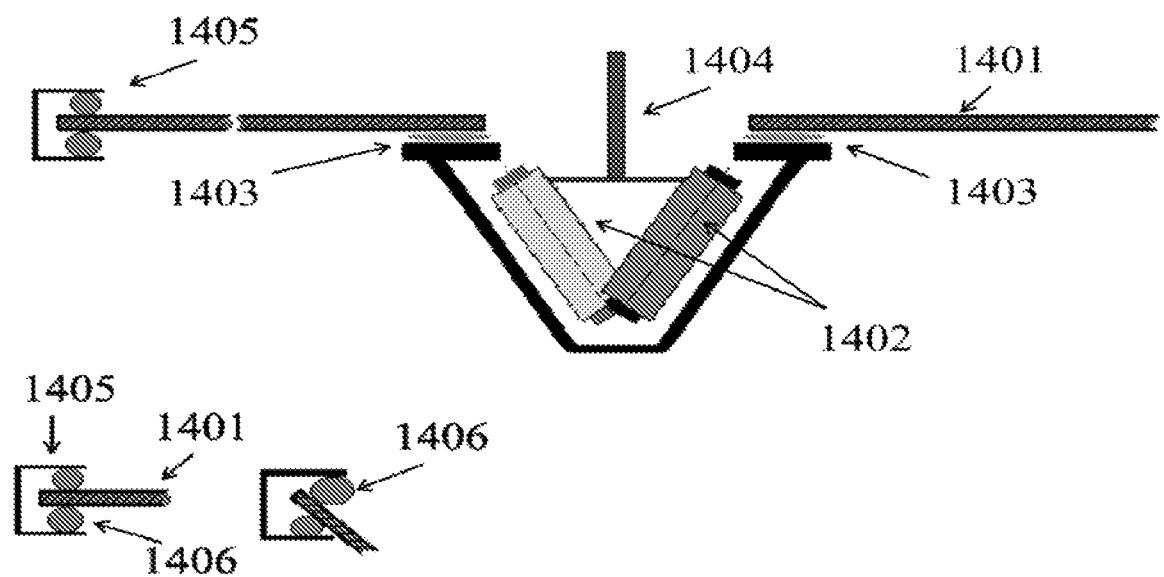
FIG. 14 depicts an exemplary implementation of a photovoltaic array system.

In FIG. 13, similar to FIG. 12, the rollers (1302) can be disposed within a channel. The internal rail can be adhered to the solar panels (1301), for example with resin (1303). FIG. 14 additionally shows a pivot arm (1404) for attaching to a brush assembly. Rubber strips (1406) with circular cross sections can be attached inside support frame members (1405) having a C-shaped cross section. The members can be used to mount the solar panels (1401). The support frame can be bolted to a main array. The support frame can be part of the main array, for example as an integral part of an extrusion. As shown in FIG. 14, a panel can be inserted straight (where there is clearance), and then can be let down to an angle of tilt. This can crush the rubber strips, and can thereby cause a locking force on the panels. The other end of the panel can be held down either by a resin stick, by small clamp, and/or by an adhesive. Conversely, the rubber bits can be attached to the panels themselves for substantially the same effect.

Figure 15:
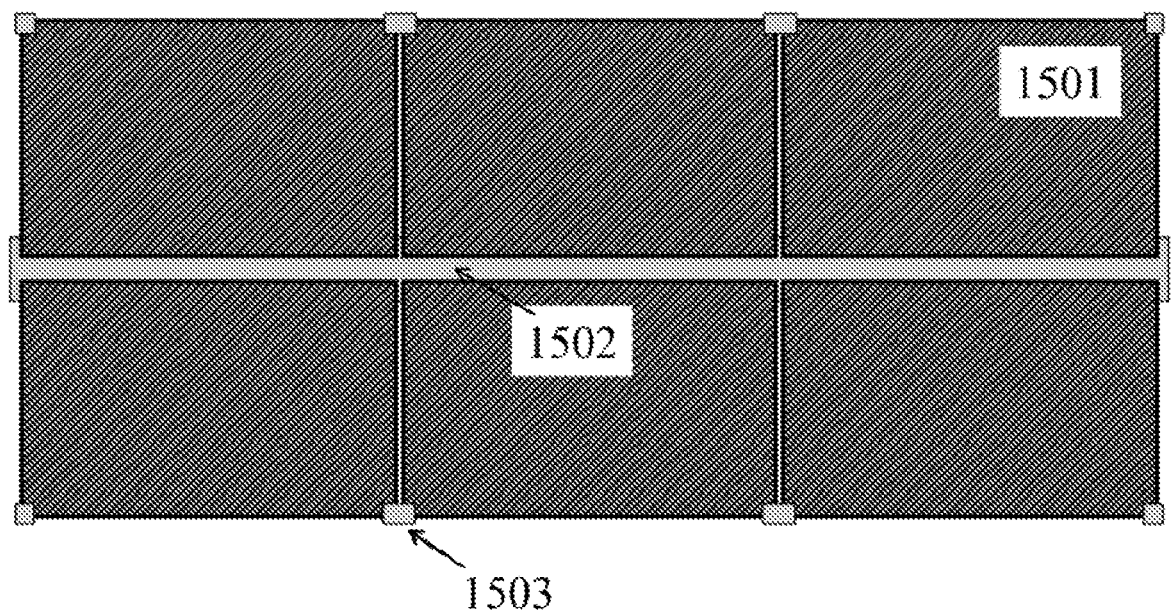
FIG. 15 depicts a photovoltaic array with a central track system.
Figure 16:
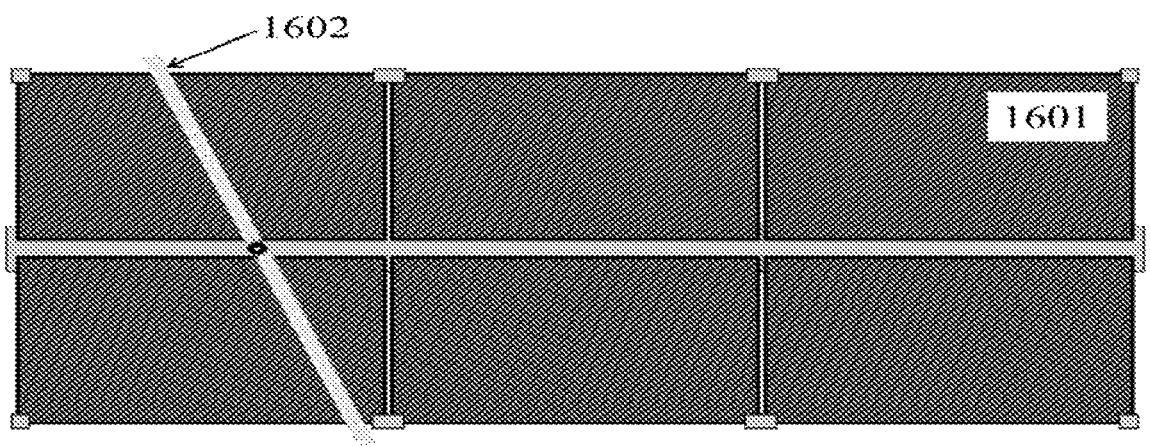
FIG. 16 depicts a photovoltaic array during operation of the system.

FIGS. 15-19 show various embodiments of a photovoltaic array. In FIG. 15, solar panels (1501) can be mounted to support structures (1503) and track (1502). The track can be an internal rail, such as a channel, or an external rail. As shown in FIG. 16, the cleaning system (1602) can be centrally mounted to a pivot connected to a carriage assembly which utilizes only a central track. Alternatively, trailing roller assemblies can be incorporated along the top, bottom, or top and bottom edges of the array of solar panels (1601), similar to embodiments shown in FIGS. 1-4.

Figure 17:
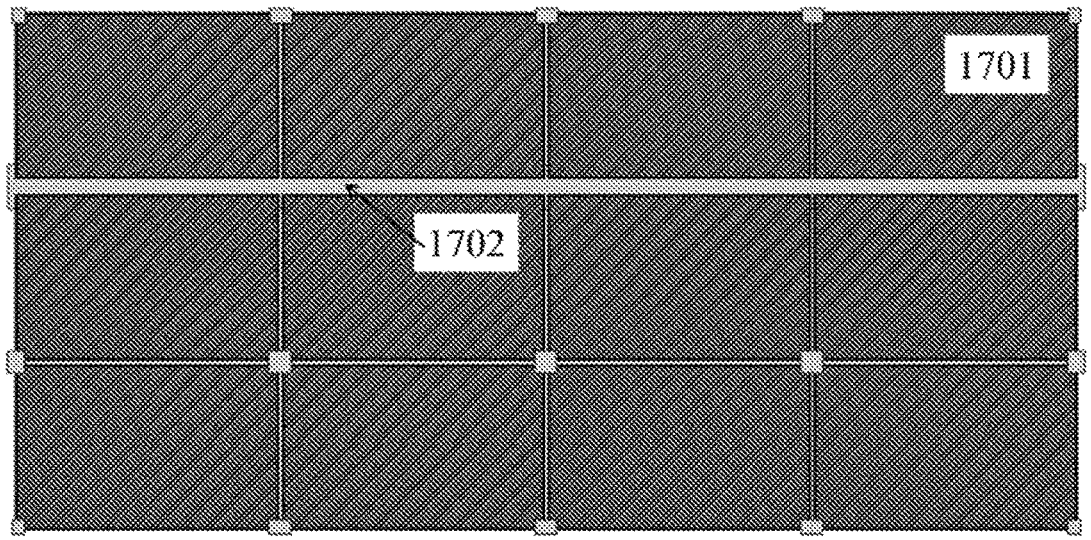
FIG. 17 depicts a photovoltaic array with an off-center track.
Figure 18:
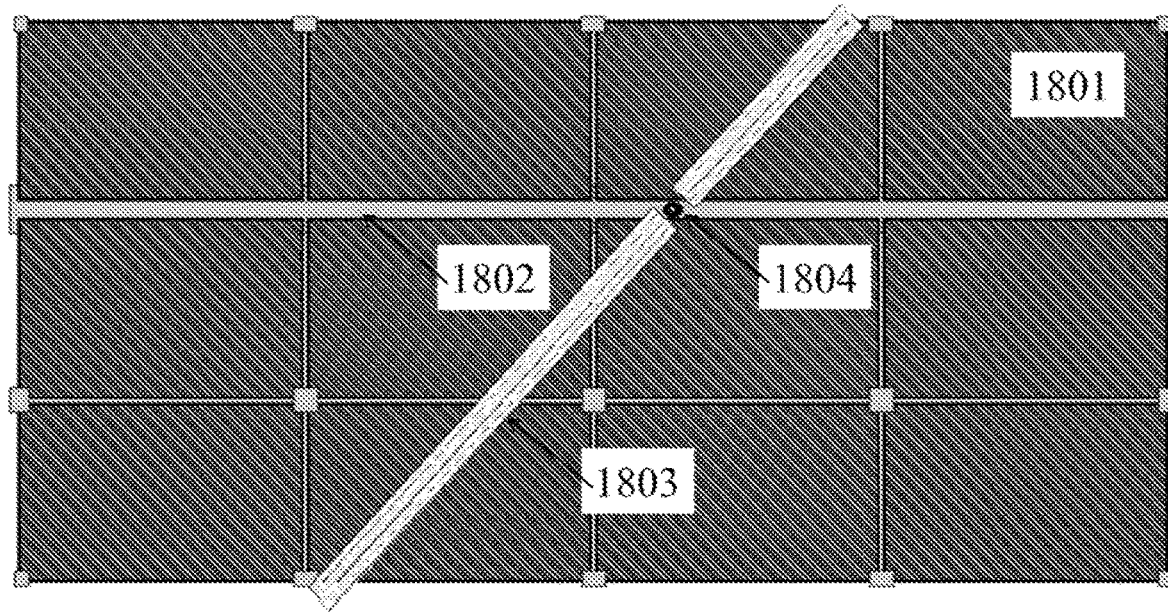
FIG. 18 depicts a photovoltaic array during operation of the system.

Referring to FIGS. 17 and 18, the array of solar panels (1701) can include a track (1702) that is off center. Here also, the track can be an internal rail, such as a channel, or an external rail. The carriage and pivot (1804) can be utilized alone or in combination with other roller assemblies to translate and pivot the cleaning system (1803).

For a centrally located track, it can be advantageous to incorporate a trailing assembly with its own drive or motor, or to incorporate a rolling resistance to facilitate pivoting. A motor can be integrated with the pivot to produce a power-actuated pivot.

Figure 19:
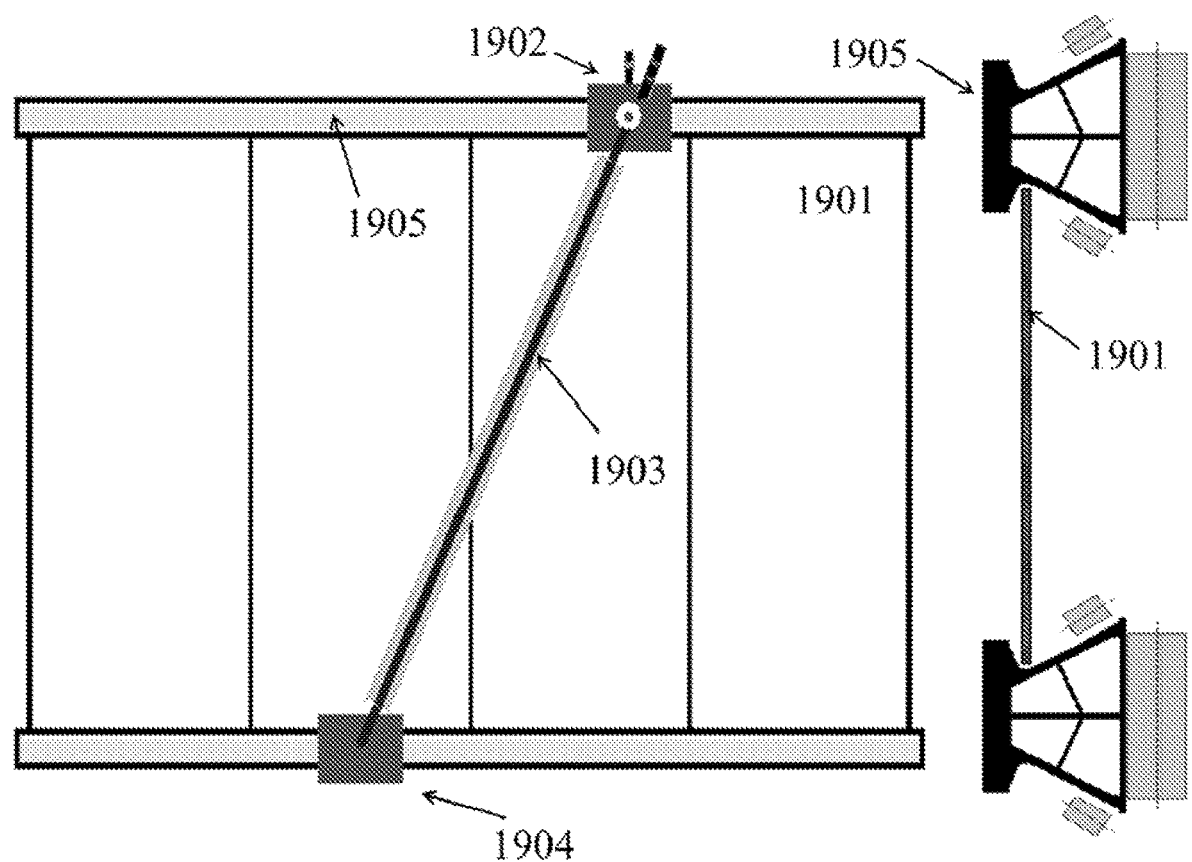
FIG. 19 depicts an overhead view and a cross sectional view of a photovoltaic array during operation of the system.

In FIG. 19, solar panels (1901) can be supported by and mounted to rails (1905). Brush assembly (1903) can be translated and operated by carriage assembly (1902). The translation, orientation, and support of the brush can further be facilitated by a trailing roller assembly (1904). As shown above, the carriage and the trailing assembly can have substantially similar roller configurations.

The cleaning system can further include a monitoring device to determine whether a cleaning is required. The device can include a meter of the output of the solar panels. Alternatively, the device can include sensor system for measuring the efficiency and/or effectiveness of the photovoltaic elements.

The monitoring device can be in communication with a control device. The control device can be configured to activate the cleaning system. The control device can be configured to send a signal indicating the status and/or the need for cleaning a panel. Additionally, the control device can be configured to send a signal indicating a fault or error in the array system, including in the cleaning system.

Figure 20B:
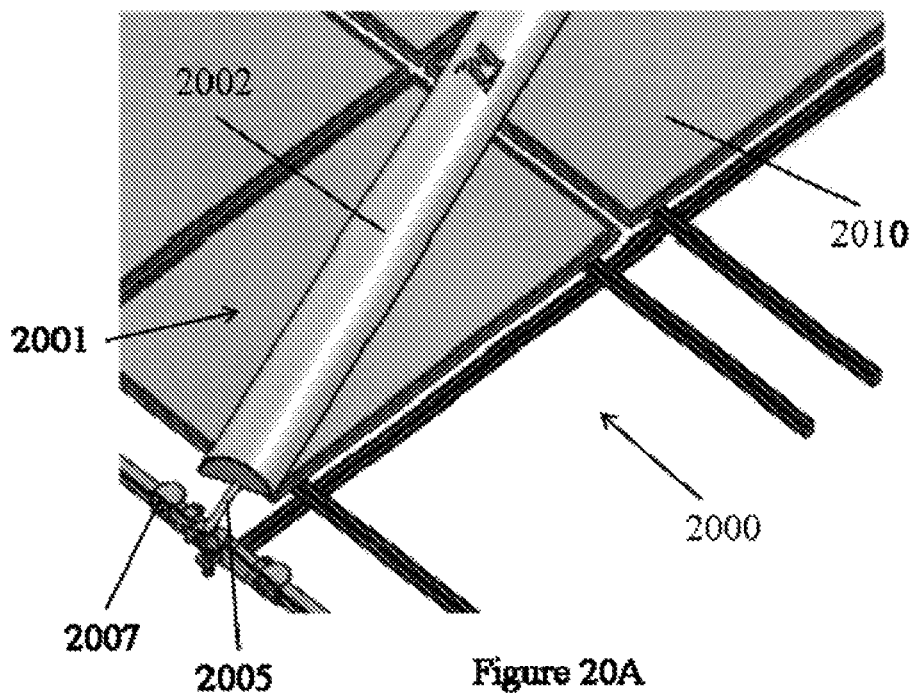
Figure 20B:
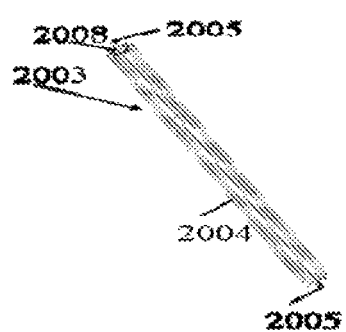

Referring to FIG. 20A, a cleaning system (2000) for cleaning solar panels (2010) is depicted. The cleaning system (2000) can include a brush assembly (2001) for cleaning the solar panels (2010). The brush assembly (2001) can include a brush (2003), as depicted in FIG. 20B. The brush (2003) can include one or more bristles (2004) extending outwardly from the core (2008). A shaft (2005), as illustrated in FIG. 20C, can extend through the core (2008) of the brush (2003). The shaft (2005) can be a telescoping shaft, which is configured to retract and expand to create an elongated brush (2003).

Figure 20D:
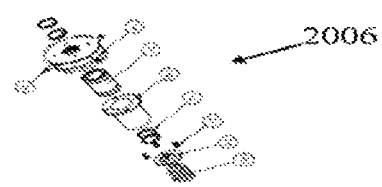
Figure 20C:
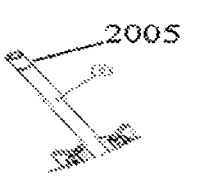
Figure 20E:
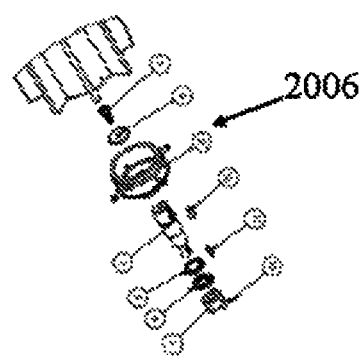

The shaft (2005) can be connected to a slider-bearing hub assembly (2006), as illustrated in FIGS. 20D and 20E, that allows the shaft (2005) to expand and retract. The slider-bearing hub assembly (2006) can include any necessary components to allow the shaft (2005) to expand and retract. For example, the slider-bearing hub assembly (2006) can include one or more washers, nuts, couplings, retainers, screws, bolts, keys, seals, bushings, etc.

Referring back to FIG. 20A, the brush assembly (2001) can include a cover (2002) that surrounds at least a portion of the brush (2003). In at least one embodiment, the cover (2002) can surround at least 180 degrees of the brush (2003). In other embodiments, the cover (2002) can surround more than 180 degrees of the brush (2003) or can surround less than 180 degrees of the brush (2003). For example, the cover (2002) can surround approximately 270 degrees or the majority of the brush (2003). The cover (2002) can be any suitable shape or material. In embodiments, the cover in generally arc-shaped.

The telescoping shaft (2005) can allow the brush assembly (2001) to be attached at either end to a carriage or trailing assembly (2007), which in turn can be attached to and configured to move along a rail. The telescoping shaft (2005) can be configured to expand and retract as the angle or the direction of movement of the brush assembly (2001) changes. Alternatively, the telescoping shaft (2005) can be configured to expand and retract to extend between different rail widths, while the angle of the brush assembly (2001) remains constant.

Figure 21:
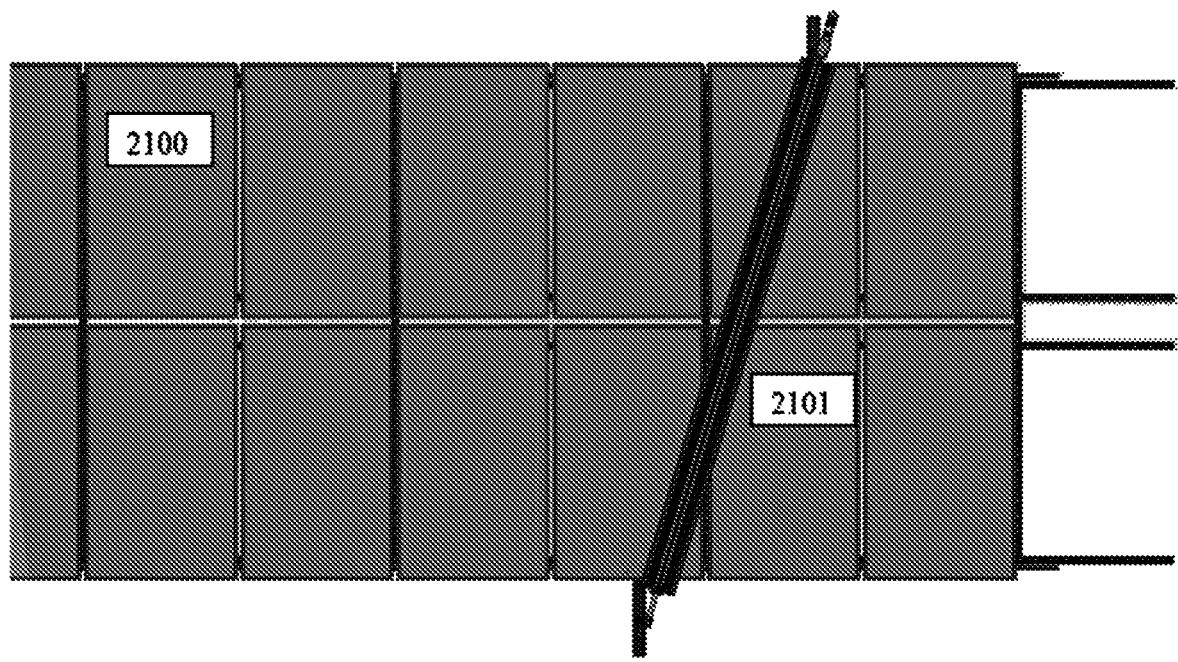
FIG. 21 depicts an overhead view of a system embodiment.
Figure 22:
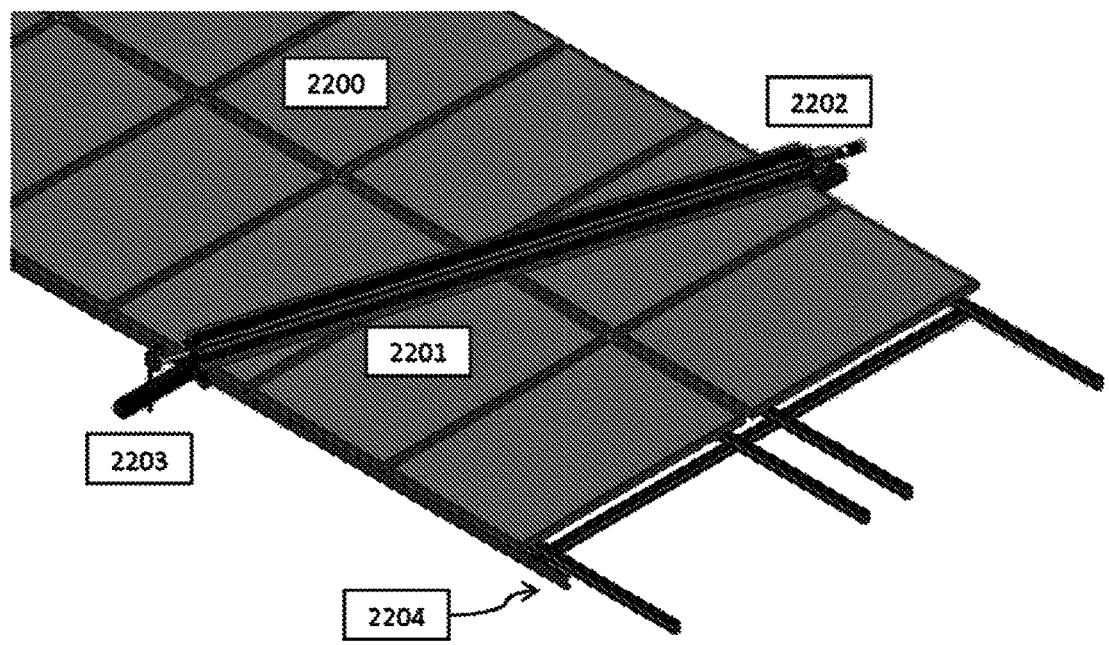
FIG. 22 depicts an angled view of a system embodiment.
Figure 23:
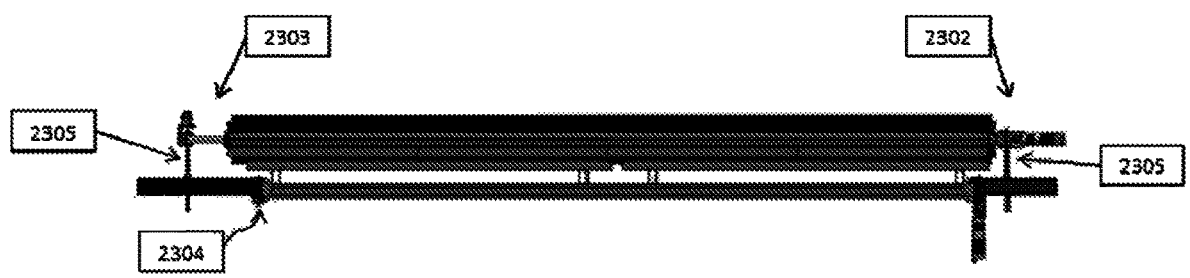
FIG. 23 depicts an side view of a system embodiment.

Three perspective views of an embodiment are shown in FIGS. 21-23. FIG. 21 specifically shows an overhead view of a solar panel array (2100) with a cleaning system (2101) in an operational configuration. As shown in the perspective of FIG. 22, the cleaning system (2201) can be vertically supported at the leading end (2202) and/or the trailing end (2203) at varying degrees from a supporting rail (2204). FIG. 23 depicts a perspective from the plane of the solar array, from which vertical supports of the leading end (2302) and the trailing end (2303) of the cleaning system are shown. In this view, the generally triangular cross-sectional shape of the track (2304) is also shown.

Figure 24:
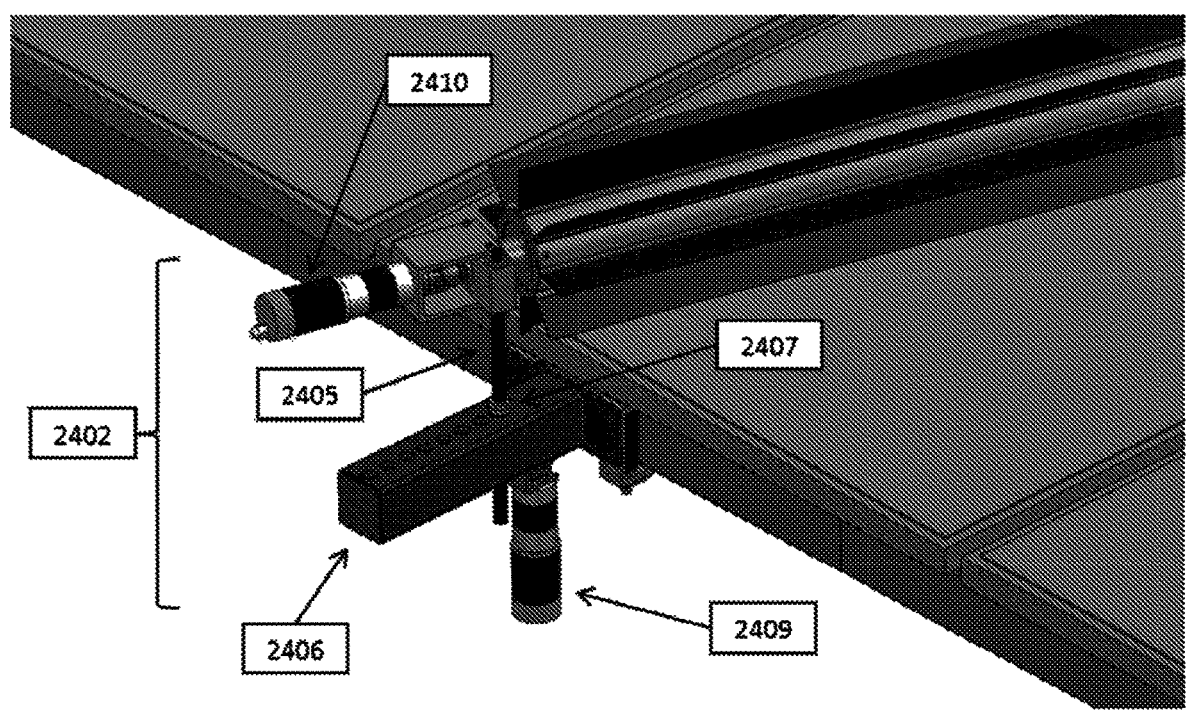
FIG. 24 depicts details of a system embodiment.

FIG. 24 shows greater detail of the leading end (2402) of the cleaning system. A vertical rod (2405) can be utilized to maintain a vertical height of the roller. The vertical rod (2405) is preferably a smooth metal rod, such as extruded aluminum. Nevertheless, the vertical rod can be a tube. The vertical rod can be threaded and held in place with one or more nuts and can include a pivot point where it attaches to the roller. The vertical rod can be horizontally positioned into one of a plurality of holes in fixed-arm (2406) of a carriage assembly that can be configured to hold tight onto a rail, which can have a triangular cross section. The vertical height of the leading end can be adjusted by utilizing, for example, two clamps (2407) on the vertical rod. Similar to other embodiments, the carriage assembly can include a drive motor (2409) that and can be configured to translate the carriage assembly along the rail. The brush can be driven by a roller drive motor (2410).

Figure 25:
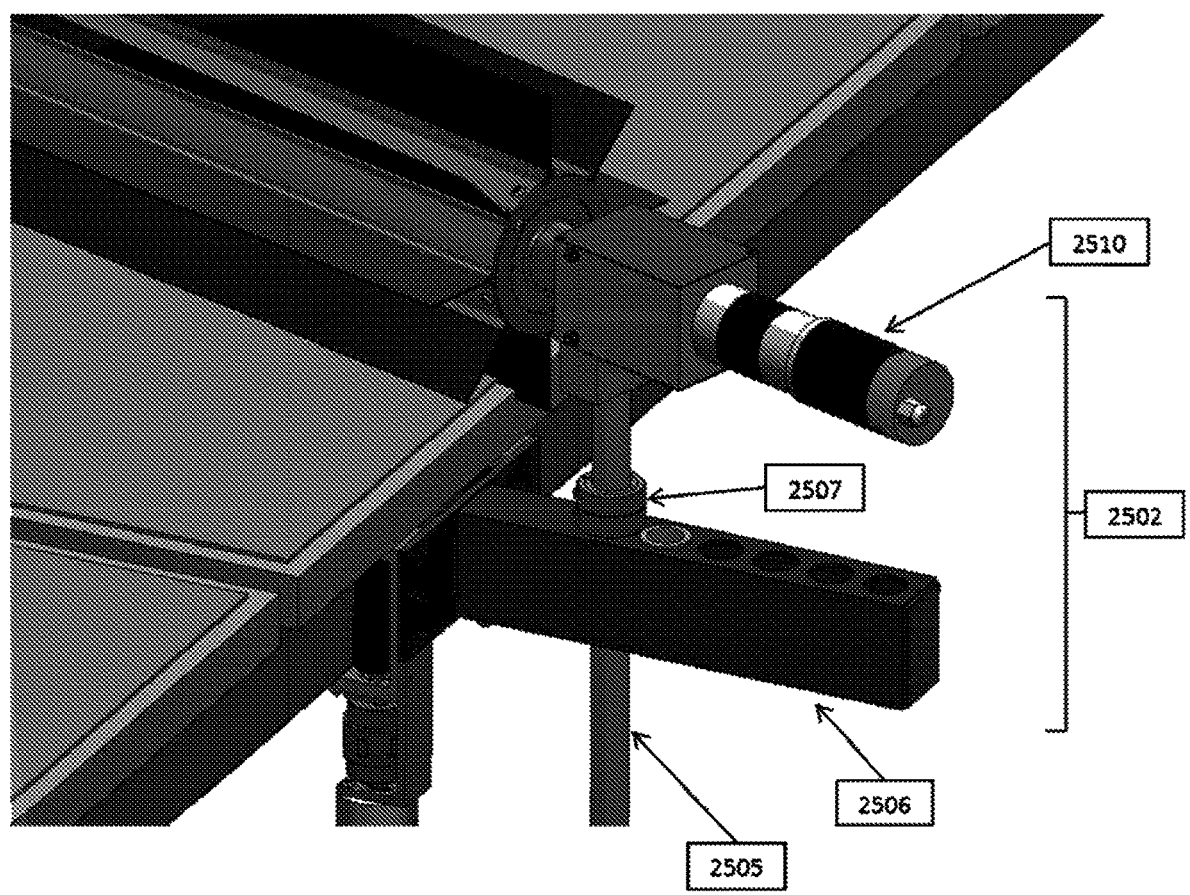
FIG. 25 depicts details of a fixed-arm.

FIG. 25 shows greater detail of a trailing end (2502) of an exemplary cleaning system. Similar to the leading end, the trailing end can utilize a vertical rod (2505) that can be horizontally positioned into one of a plurality of holes in a fixed-arm (2506) of a trailing assembly that can be configured to hold onto a rail or track. As a person having ordinary skill in the art can appreciate, the trailing assembly can utilize a rail similar to the rail adjacent the leading carriage, but for eased mechanical constraints many additional rail and/or track configurations can be utilized. The vertical height of the trailing end can be adjusted by utilizing, for example, two clamps (2507) on the vertical rod. The brush can be driven by a roller drive motor (2510).

Figure 26:
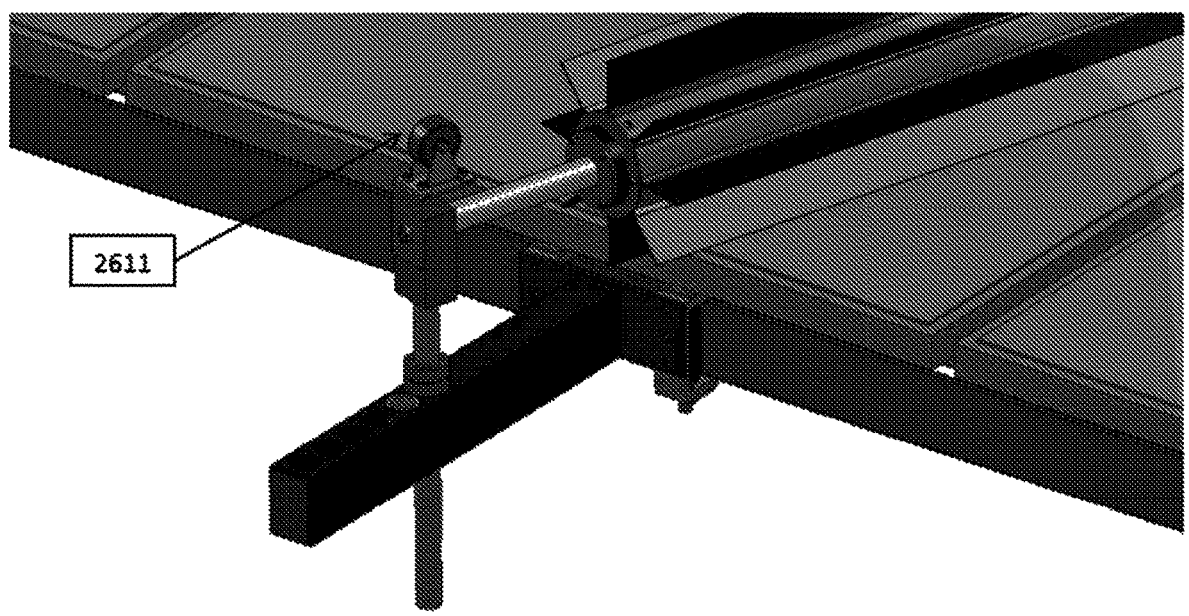
FIG. 26 depicts an aspect of a system embodiment.

Although the trailing assembly is shown with motors in FIG. 25, the trailing assembly can be utilized without a drive motor and/or without a roller motor, as discussed with respect to other embodiments. Such an alternative embodiment without a drive motor or a roller motor is shown in FIG. 26. The embodiment additionally shows a caster (2611) that can be utilized with a cover, such as the cover (2002) shown in FIG. 20A. Such castors can be utilized in other embodiments as discussed below and can facilitate motion—along the direction of the brush axis—of the cover with respect to the trailing assembly.

Figure 27:
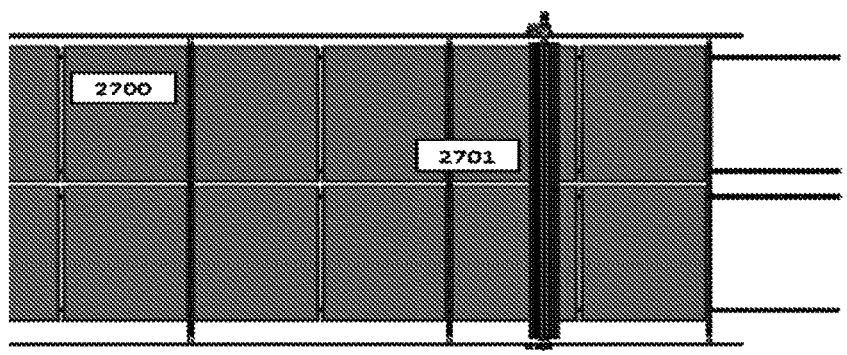
FIG. 27 depicts an overhead view of a system embodiment.
Figure 28:
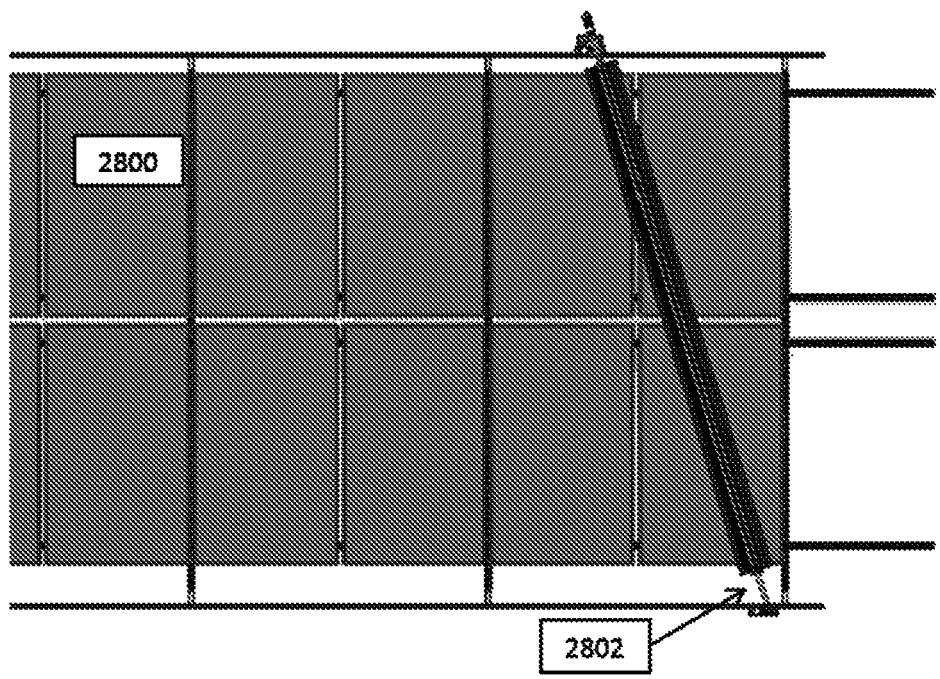
FIG. 28 depicts an overhead view of a system embodiment in an operation mode.

FIGS. 27-30 show an alternative embodiment in which the cleaning system can include a sliding "trombone" component. FIG. 27 specifically shows an overhead view of a solar panel array (2700) with a cleaning system (2701). FIG. 28 shows the same embodiment in an operational configuration. Moving from FIG. 27 to FIG. 28, it can be seen that the cleaning system utilizes a sliding shaft (2802) near the trailing assembly. The sliding shaft can be extended as in FIG. 28, and the sliding shaft can be retracted to allow a centered configuration of the roller as in FIG. 27. In operation, the brush can rotate and the driven carriage can move the leading assembly along a rail. As the cleaning system rotates into an operational configuration, the sliding shaft can contemporaneously move axially through the roller, for example, along bearings. Such motion can lengthen and shorted the effective length of the brush between leading and trailing assemblies.

Figure 29:
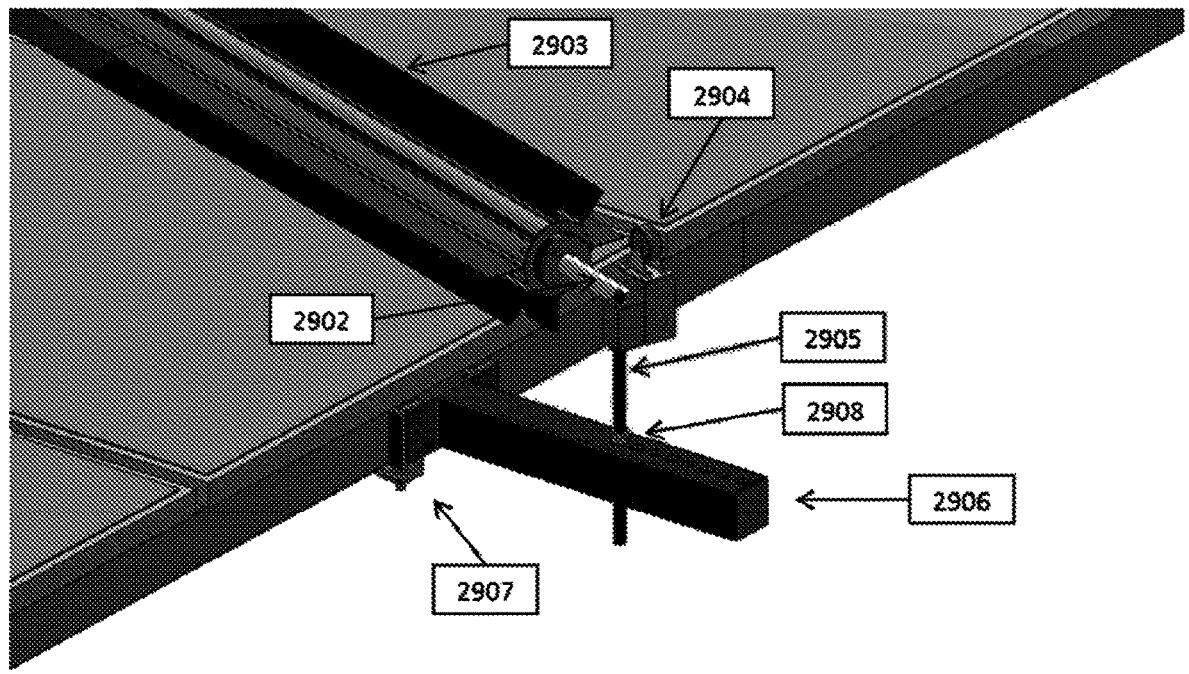
FIG. 29 depicts details of a system embodiment.

FIG. 29 depicts greater detail of the trailing end of the cleaning system. The sliding shaft (2902) can be located coaxially with the roller and brushes (2903). A weight-bearing castor arrangement (2904) can be utilized, e.g., to support a cover of the cleaning system. In this embodiment, a lower vertical support rod (2905) can be positioned in a holder on a fixed-arm (2906) of a trailing assembly. The trailing assembly can include a trailing carriage (2907) that can be configured to hold onto a rail or track. The lower vertical support can be used in conjunction with a height-adjustment component such as clamps (2908) to adjust the height of the roller and brushes with respect to the solar panel array.

The fixed arm can be utilized to position the lower vertical support at a large fixed distance from the carriage and rail. Alternatively, the rail can be located closer to the bottom edge of the panels. A key design feature can be that the system can adjust for different amounts of overhang of the panels, which can be an advantage over many prior systems where the panels are supported closer to their centers.

Figure 30:
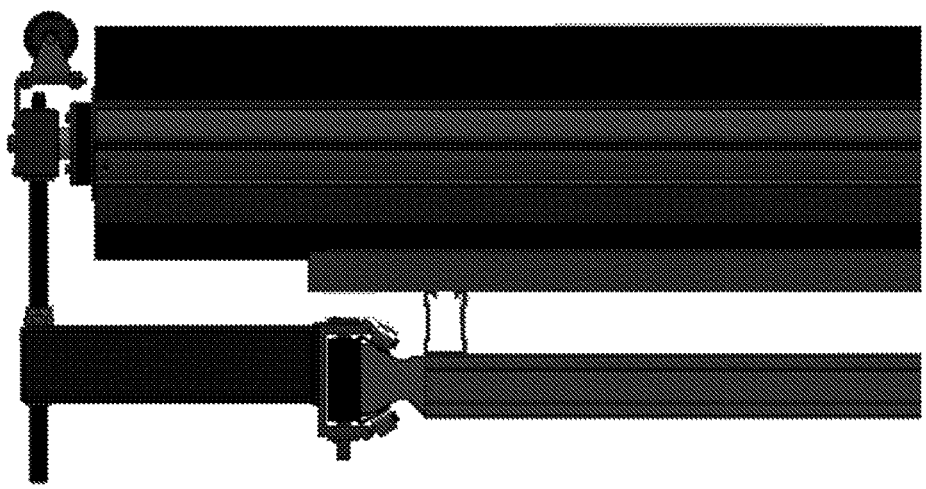
FIG. 30 depicts details of a system embodiment.

As shown in FIG. 30, the castor can be either in the brush hub—for example, with stationery sliding bar—or in the lower support—for example, with a rotating sliding bar. The bearing can be inside the hub.

Figure 31:
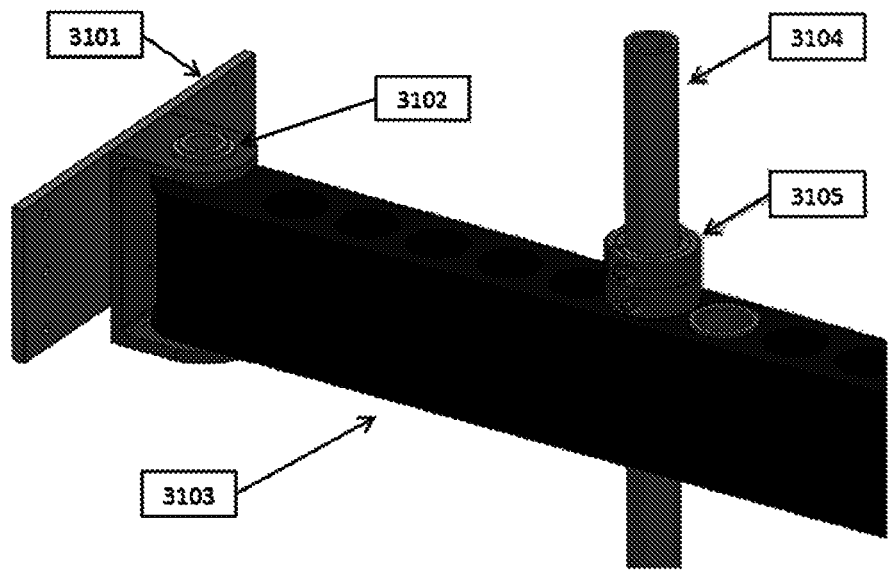
FIG. 31 depicts details of a swing arm for use in certain embodiments.
Figure 32:
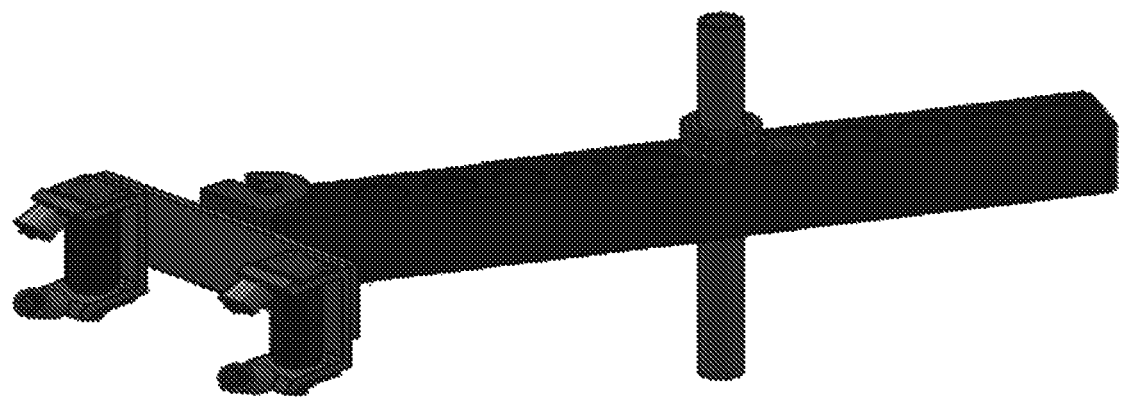
FIG. 32 depicts details of a swing arm for use in certain embodiments.

FIGS. 31-35 depict an alternative aspect in which the cleaning system can include a swing arm for supporting the trailing end of a cleaning system. The swing arm, or hinged lever arm, such as one shown in FIG. 31, can provide variations in distance from the cart of the vertical support. As with some other aspects, the brush can be vertically supported on the leading and/or trailing ends at varying degrees from a track or rail. In this exemplary embodiment, the trailing end can include a plate (3101) for attachment to a cart or carriage. The plate can have a pivot (3102) for pivotally connecting the swing arm (3103). Similar to the fixed arm of some other embodiments, the swing arm can include holes for receiving a vertical support rod (3104) which can be used in conjunction with clamps (3105) for adjusting the height of the roller and brushes. In place of plate (3101), the pivot can be integrated with a cart or carriage for the trailing end as shown in FIG. 32. FIG. 32 further shows a notch in the pivot for aiding installation and removal of the swing arm.

Figure 33:
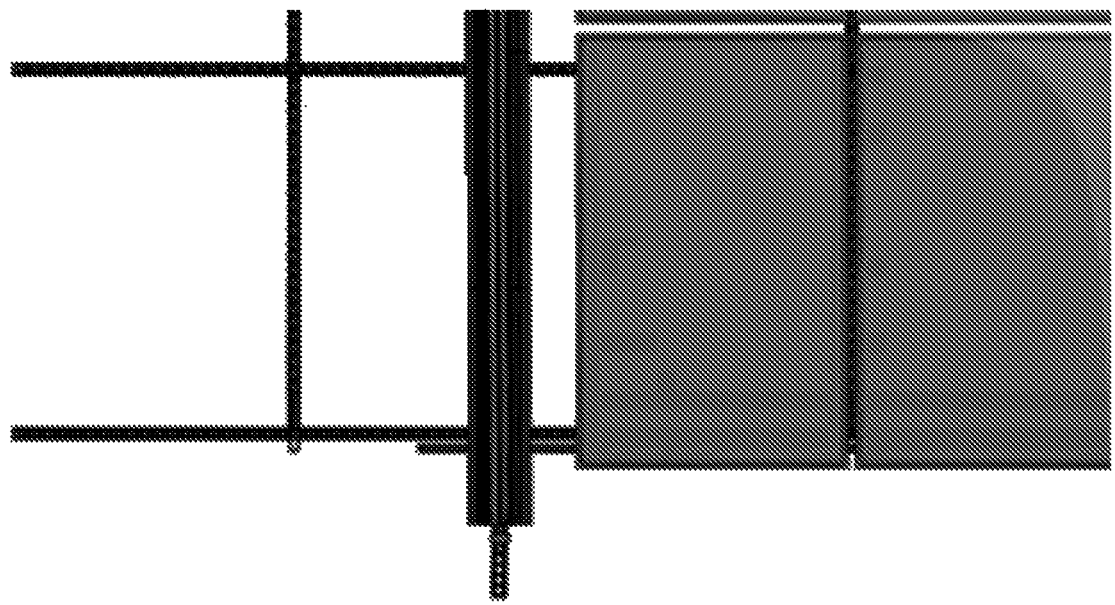
FIG. 33 depicts an overhead view of an embodiment including a swing arm.
Figure 34:
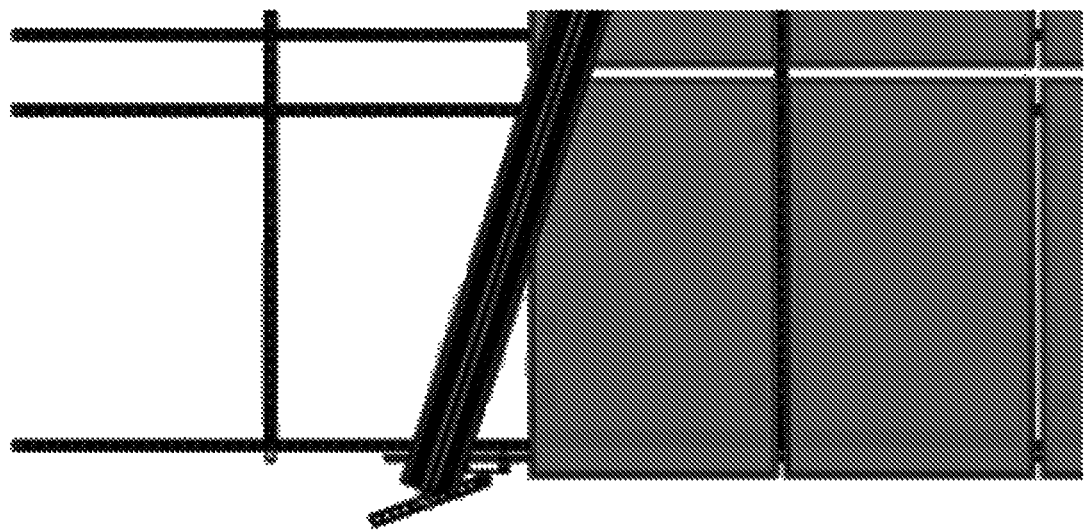
FIG. 34 depicts an overhead view of an embodiment including a swing arm in an operation mode.
Figure 35:
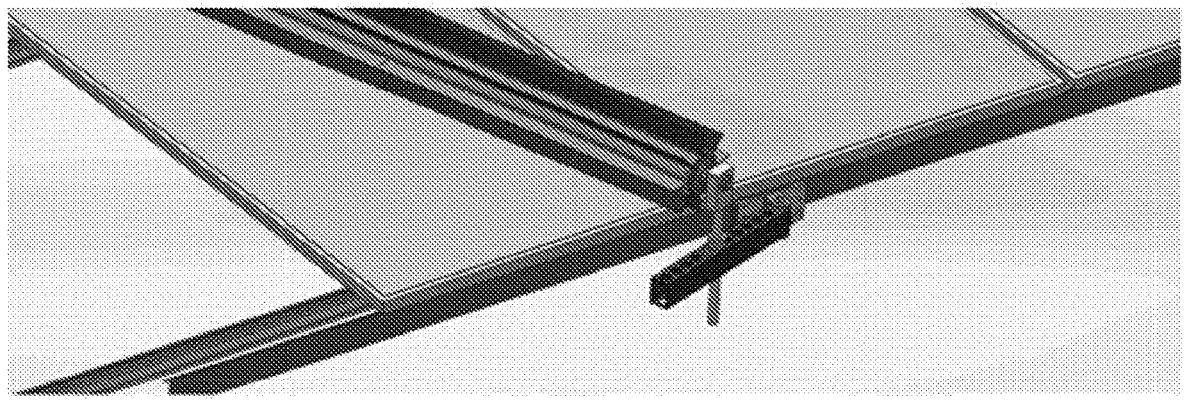
FIG. 35 depicts a side view of an embodiment including a swing arm in an operation mode.

A swing arm configuration can be advantageous over a sliding rod system, as shown in FIGS. 27-30, as the roller support hub can be made stronger and with fewer parts. This advantage is depicted in the overhead views of FIGS. 33 and 34 and in the side view of FIG. 35. As shown in FIG. 33, the swing arm can begin in a substantially extended position. In FIG. 34, the top carriage has translated along the top rail, and the brush has moved into an angled position. During such motion, the brush can rotate, and at the same time, the angle of the swing arm can change, as shown also in FIG. 35, increasing the distance of the vertical support from the track. This aspect can be combined with other aspects simply and cheaply without needing to position the track a large distance from the lower panel edge (reducing cost) or the use of slider roller bearings and sliding shafts (further reducing costs).

Various embodiments herein, such as those depicted in FIGS. 21, 29, and 31, can utilize one or more vertical support rods in combination with support arms. This aspect can accommodate different vertical and horizontal positioning of the brushes in relation to the carts or carriages. This can allow implementation in many types of array structures and configurations. Turning again to FIG. 31, though not limited to any one embodiment, the vertical support can be a smooth vertical bar (3104). The vertical location of the brush can be altered by loosening the circular clamps (3105) and retightening one at a time. Although the circular clamps shown are split bushings, other components can be used, such as a threaded rod or pipe with nuts or a smooth rod with pre-drilled holes for cotter pins, etc. The vertical support rod can be affixed in place with only a single clamp. However, the addition of a second clamp can make adjustments, especially small adjustments, easier. Horizontal positions can be altered by locating the vertical support bar in different holes at different distances from the cart. Such components can be utilized in constructing a simple yet universal system that can include sufficient variability to adapt the cleaning system to preexisting solar panel arrays.

Figure 36A:
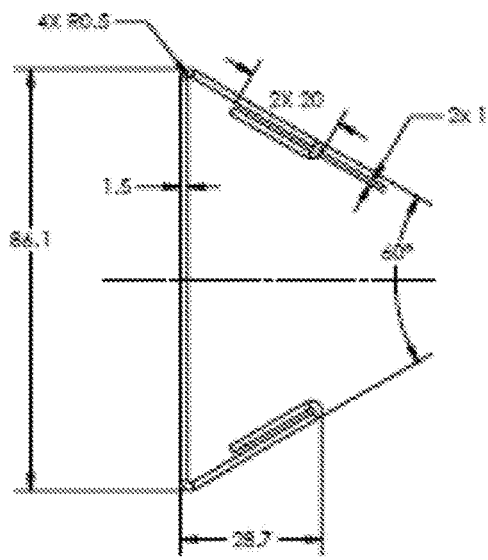
FIGS. 36A-36C depict aspects of a rail.
Figure 36B:
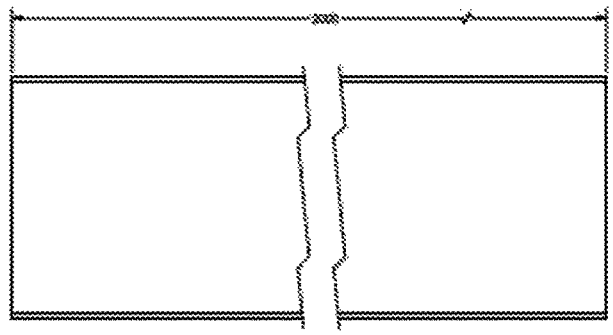
Figure 36C:
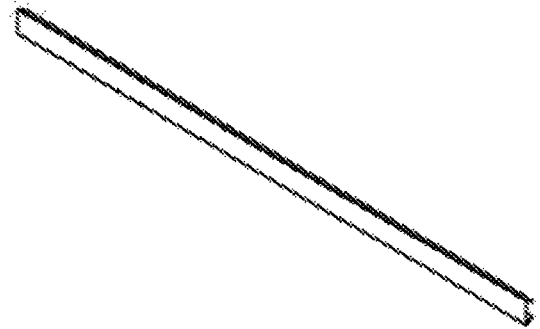
Figure 37A:
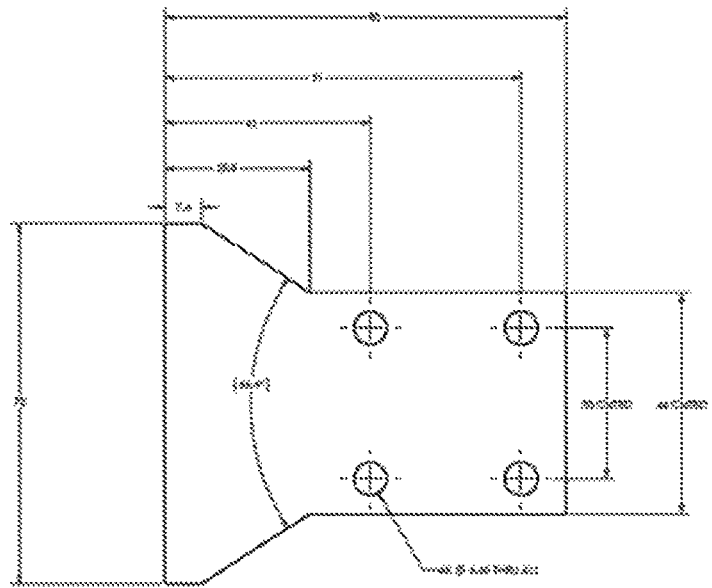
FIGS. 37A-37C depict aspects of support structures for a rail.
Figure 37B:
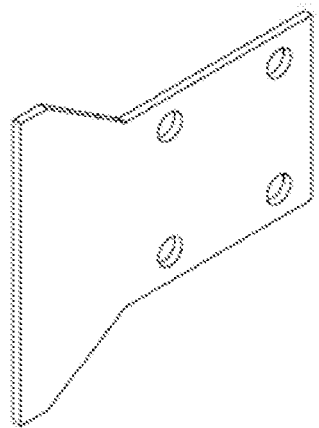
Figure 37C:
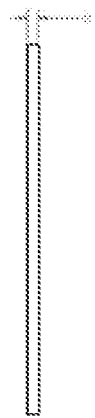

FIGS. 36-38 schematically depict an easily assembled track that can be utilized within certain embodiments. The track can exhibit good structural rigidity while also being compactly packaged and can be assembled by a single person, e.g., in the field.

FIG. 36 shows exemplary aspects of a rail. A cross section of the rail is depicted in FIG. 36A. A side view of the rail is depicted in FIG. 36B, and an angled view is depicted in FIG. 36C. The rails can be made of any suitable material. In some embodiments, the rails are constructed from rolled sheet metal and molded into shape. This can be particularly advantageous for installing tracks in the field of any length desired.

FIG. 37 depicts structural support plates for the rail that can be inserted into a rail and snapped into place by twisting the plates. The support plates can be held in place by a spring force due to the construction of the rail or by brackets built into the rail. The structural supports are preferably extruded aluminum, but other materials can be used as preferred for specific structural or functional properties. Any desired number of support plates can be utilized and it should be appreciated by a person of ordinary skill that as the desired length of a rail increases, the number of support plate can also be increased.

Figure 38A:
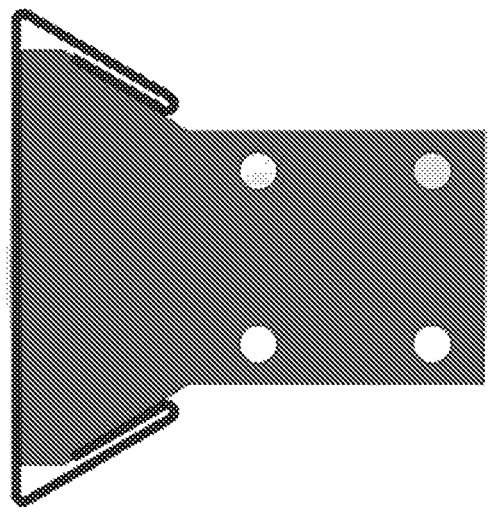
FIGS. 38A and 38B depict a rail with support structures installed.
Figure 38B:
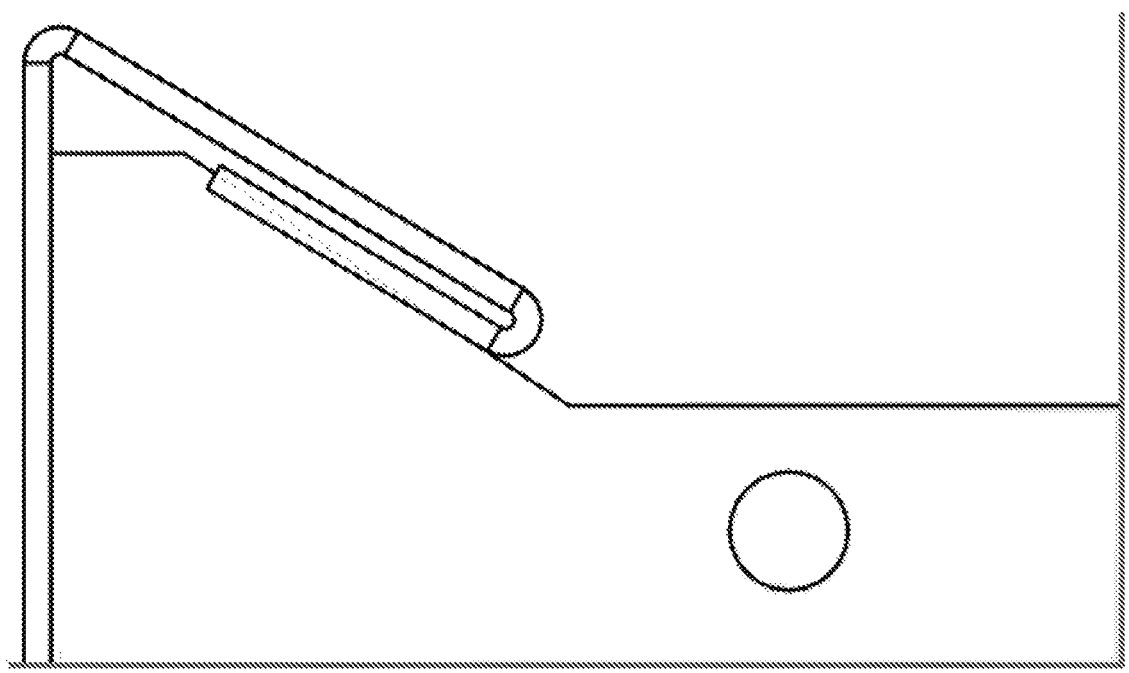

The complementary shapes of the rail and the structural support plates are shown in FIG. 38A. The support plates can be located periodically, for example every foot or every few feet, along the rail. Such plates can add to the strength and structural rigidity of the rail once installed, and the structural support plates can also be utilized to attach the rail to solar panel array supports. FIG. 38B shows greater detail of the complementary shapes of the rail and the support plate. A folded-over lip in the rail can be utilized to provide a spring force for holding the plates in place. The dashed line in FIG. 38B specifically shows how a folded-over lip can be further compressed by the support plate and how the extended portion of the support plate is pushed toward the outer face of the rail. This configuration can provide further rigidity in the face of the rail to prevent torsion or other deformation of the rail.

Details of one or more embodiments are set forth in the accompanying drawings and description. Other features, objects, and advantages will be apparent from the description, drawings, and claims. Although a number of embodiments of the invention have been described, it will be understood that various modifications can be made without departing from the spirit and scope of the invention. It should also be understood that the appended drawings are not necessarily to scale, presenting a somewhat simplified representation of various features and basic principles of the invention.

What is claimed is:

1. A cleaning apparatus, comprising:
    a leading carriage assembly attached to a brush assembly and configured to drive the brush assembly;
    a trailing carriage assembly configured to move along a track;
    an arm attached to the trailing carriage assembly, wherein the arm extends away from the track and has plural holes; and
    a vertical support rod partially disposed within one hole of the plural holes of the arm, wherein the vertical support rod is attached to the brush assembly,
    wherein a height of the trailing carriage relative to the track is adjusted by one or more clamps located around the vertical support rod.
2. The cleaning apparatus of claim 1, wherein the arm is a fixed arm.
3. The cleaning apparatus of claim 2, wherein the brush assembly further comprises a slide rod.
4. The cleaning apparatus of claim 1, wherein the arm is a swing arm.
5. The cleaning apparatus of claim 1, wherein the leading carriage assembly is configured to allow pivoting of a rotational axis of the brush assembly in a plane parallel to the track.
6. The cleaning apparatus of claim 1, wherein the brush assembly includes at least one brush having a straight bristle pattern.
7. A cleaning apparatus, comprising:
    a brush assembly comprising at least one rotatable brush having a rotational axis;
    a top track and a bottom track, wherein each of the top track and bottom track comprise a rail and support plates, wherein two or more edges of the support plates describe a portion of a shape that is complementary to two or more internal surfaces of the rail;
    a carriage assembly having three or more rollers, wherein the three or more rollers are configured to abut three outer surfaces of the rail;
    an arm attached to the carriage assembly, wherein the arm extends away from the rail and has plural holes; and
    a vertical support partially disposed within one hole of the plural holes of the arm,
    wherein the vertical support is attached to the brush assembly and is configured to adjust a height of the brush assembly relative to the track.
8. The cleaning apparatus of claim 7, wherein the arm is a fixed arm.
9. The cleaning apparatus of claim 7, wherein the brush assembly further comprises a slide rod.
10. The cleaning apparatus of claim 7, wherein the arm is a swing arm.
11. The cleaning apparatus of claim 7, wherein the rail of the top track has a triangular cross-section and the rail of the bottom track has a triangular cross-section.
12. The cleaning apparatus of claim 7, wherein the carriage assembly includes a leading carriage assembly configured to allow pivoting of a rotational axis of the brush assembly in a plane parallel to the track.
13. A panel cleaning assembly, comprising:
    a brush assembly having a leading end and a trailing end;
    a leading vertical support connected to a drive assembly and attached to the leading end of the brush assembly;
    a trailing vertical support attached to the trailing end of the brush assembly;
    first and second arms attached to corresponding tracks and having corresponding plural holes; and
    one or more detachable clamps attached to each of the leading vertical support and the trailing vertical support,
    wherein heights of the brush assembly are adjusted by positioning (i) the leading vertical support and the trailing vertical support in corresponding holes of the first and second arms, respectively, and (ii) the detachable clamps along the leading vertical support and the trailing vertical support.

14. The panel cleaning assembly of claim 13, wherein the first arm is a fixed arm.

15. The panel cleaning assembly of claim 14, wherein the brush assembly further comprises a slide rod.

16. The panel cleaning assembly of claim 13, wherein the first arm is a swing arm.

17. The panel cleaning assembly of claim 13, wherein the brush assembly comprises a rotatable brush having a rotational axis and a slide rod positioned co-linearly with the rotatable brush.

18. The panel cleaning assembly of claim 17, wherein the trailing vertical support is connected to a trailing assembly via a fixed arm.

19. The panel cleaning assembly of claim 18, wherein a slide rod is configured to slide along the rotational axis to allow the brush assembly to rotate in a plane parallel to the panel.

20. The cleaning apparatus of claim 13, wherein the brush assembly includes at least one brush having a straight bristle pattern.

\* \* \* \* \*